US012656548B2

(12) United States Patent
Kaneko et al.

(10) Patent No.:  US 12,656,548 B2
(45) Date of Patent:  Jun. 16, 2026

(54) OPTICAL FIBER ARRANGEMENT METHOD, OPTICAL FIBER FUSION SPLICING METHOD, METHOD FOR MANUFACTURING OPTICAL FIBER RIBBON WITH CONNECTOR, AND INTERMITTENTLY CONNECTED OPTICAL FIBER RIBBON

(71) Applicant: Fujikura Ltd., Tokyo (JP)

(72) Inventors: Soichiro Kaneko, Chiba (JP); Koji Tomikawa, Sakura (JP); Ken Osato, Sakura (JP); Noriaki Yamashita, Sakura (JP)

(73) Assignee: Fujikura Ltd., Tokyo (JP)

( * ) Notice: Subject to any disclaimer, the term of this patent is extended or adjusted under 35 U.S.C. 154(b) by 232 days.

(21) Appl. No.: 18/427,345

(22) Filed: Jan. 30, 2024

(65) Prior Publication Data

US 2024/0168230 A1      May 23, 2024

Related U.S. Application Data

(62) Division of application No. 17/634,138, filed as application No. PCT/JP2020/027217 on Jul. 13, 2020, now Pat. No. 11,927,803.

(30) Foreign Application Priority Data

Sep. 12, 2019   (JP) ................................. 2019-165999

(51) Int. Cl.
*G02B 6/08*          (2006.01)
*G02B 6/245*          (2006.01)
(Continued)

(52) U.S. Cl.
CPC ............. *G02B 6/2555* (2013.01); *G02B 6/08* (2013.01); *G02B 6/245* (2013.01); *G02B 6/25* (2013.01);
(Continued)

(58) Field of Classification Search
CPC . G02B 6/08; G02B 6/245; G02B 6/25; G02B 6/255; G02B 6/2551; G02B 6/2555;
(Continued)

(56) References Cited

U.S. PATENT DOCUMENTS 4,415,347 A    11/1983  Malinge et al.
8,548,294 B2   10/2013  Toge et al.
(Continued)

FOREIGN PATENT DOCUMENTS

CN       107703586 A      2/2018
CN       207601361 U      7/2018
(Continued)

OTHER PUBLICATIONS

International Search Report issued in corresponding International Application No. PCT/JP2020/027217, mailed on Aug. 11, 2020 (5 pages).

(Continued)

*Primary Examiner* — Ryan A Lepisto
(74) *Attorney, Agent, or Firm* — Osha Bergman Watanabe & Burton LLP

(57)          ABSTRACT

An optical fiber arrangement method includes: preparing an intermittently connected optical fiber ribbon including optical fibers arranged side by side at a first pitch larger than a fiber diameter; holding a non-connecting region of the optical fiber ribbon with a holder, wherein connecting portions of the optical fiber ribbon intermittently connect the optical fibers extending out from the holder to each other; changing a width of the optical fiber ribbon in an interior of the holder; and arranging the optical fibers, extending out from the holder, with intervals of the optical fibers changed from the first pitch to a second pitch smaller than the first pitch by removing the connecting portions in a holding state where the holder is holding the optical fibers.

15 Claims, 18 Drawing Sheets

(51) Int. Cl.

| | |
|---|---|
| *G02B 6/25* | (2006.01) |
| *G02B 6/255* | (2006.01) |
| *G02B 6/36* | (2006.01) |
| *G02B 6/40* | (2006.01) |
| *G02B 6/44* | (2006.01) |
| *G02B 6/46* | (2006.01) |

(52) U.S. Cl.
CPC ......... *G02B 6/2551* (2013.01); *G02B 6/3636* (2013.01); *G02B 6/3652* (2013.01); *G02B 6/40* (2013.01); *G02B 6/44* (2013.01); *G02B 6/4403* (2013.01); *G02B 6/255* (2013.01); *G02B 6/46* (2013.01)

(58) Field of Classification Search
CPC ...... G02B 6/3636; G02B 6/3652; G02B 6/40; G02B 6/44; G02B 6/4403; G02B 6/46
See application file for complete search history.

(56) References Cited

U.S. PATENT DOCUMENTS

| | | | |
|---|---|---|---|
| 8,787,718 B2 | 7/2014 | Tanabe et al. |
| 9,086,555 B2 | 7/2015 | Namazue et al. |
| 9,116,321 B2 | 8/2015 | Sato et al. |
| 9,389,386 B2 | 7/2016 | Matsuzawa et al. |
| 9,739,965 B2 | 8/2017 | Isaji et al. |
| 9,995,896 B2 | 6/2018 | Namazue et al. |
| 10,101,549 B2 | 10/2018 | Hoshino et al. |
| 10,107,980 B1 | 10/2018 | Debban et al. |
| 10,310,203 B2 | 6/2019 | Agata et al. |
| 10,345,516 B2 | 7/2019 | Sajima et al. |
| 10,688,740 B2 | 6/2020 | Moriya et al. |
| 10,718,917 B2 | 7/2020 | Fallahmohammadi et al. |
| 10,782,495 B2 | 9/2020 | Fallahmohammadi et al. |
| 10,983,297 B2 | 4/2021 | Fallahmohammadi et al. |
| 10,989,888 B2 | 4/2021 | Debban et al. |
| 11,036,024 B2 | 6/2021 | Tanaka et al. |
| 11,099,337 B2 | 8/2021 | Bradley |
| 11,500,171 B2 | 11/2022 | Fallahmohammadi et al. |
| 11,536,922 B2 | 12/2022 | Kaneko et al. |
| 11,635,581 B2 | 4/2023 | Kuramitsu et al. |
| 2013/0343712 A1 | 12/2013 | Matsuzawa et al. |
| 2014/0233899 A1 | 8/2014 | Miyamoto et al. |
| 2015/0063766 A1 | 3/2015 | Chen |
| 2016/0223769 A1 | 8/2016 | Ito et al. |
| 2016/0299310 A1 | 10/2016 | Kaneko et al. |
| 2017/0146760 A1 | 5/2017 | Kaji et al. |
| 2018/0074261 A1 | 3/2018 | Burek et al. |
| 2019/0235173 A1* | 8/2019 | Sato ..................... G02B 6/3636 |
| 2022/0317399 A1 | 10/2022 | Murakoshi et al. |

FOREIGN PATENT DOCUMENTS

| | | | |
|---|---|---|---|
| CN | 109791254 A | 5/2019 |
| EP | 3 282 295 A1 | 2/2018 |
| JP | H07270639 A | 10/1995 |
| JP | H11-326726 A | 11/1999 |
| JP | 2003241042 A | 8/2003 |
| JP | 2005258129 A | 9/2005 |
| JP | 2005309259 A | 11/2005 |
| JP | 2011064874 A | 3/2011 |
| JP | 2012027129 A | 2/2012 |
| JP | 2012118358 A | 6/2012 |
| JP | 2012-234122 A | 11/2012 |
| JP | 2012252245 A | 12/2012 |
| JP | 2013088617 A | 5/2013 |
| JP | 2013-178583 A | 9/2013 |
| JP | 2013182157 A | 9/2013 |
| JP | 5457528 B1 | 4/2014 |
| JP | 5564026 B2 | 7/2014 |
| JP | 2014202795 A | 10/2014 |
| JP | 2014215493 A | 11/2014 |
| JP | 2014-228688 A | 12/2014 |
| JP | 2015052704 A | 3/2015 |
| JP | 5789630 B2 | 10/2015 |
| JP | 2017032938 A | 2/2017 |
| JP | 2017062431 A | 3/2017 |
| JP | 2017-191211 A | 10/2017 |
| JP | 2017187706 A | 10/2017 |
| JP | 2017194561 A | 10/2017 |
| JP | 2018045231 A | 3/2018 |
| JP | 2020003620 A | 1/2020 |
| JP | 2020-030407 A | 2/2020 |
| JP | 2020-181048 A | 11/2020 |
| TW | 201403158 A | 1/2014 |
| WO | 2016163190 A1 | 10/2016 |

OTHER PUBLICATIONS

Extended European Search Report issued Aug. 10, 2023, in corresponding European Patent Application No. 20863160.6, 11 pages.

* cited by examiner

WIDTH DIRECTION $D (=200 \ \mu m)$

RIBBON THICKNESS DIRECTION $11(15)$ $Pf_1 (=250 \ \mu m)$ $11(15)$ $11(15)$

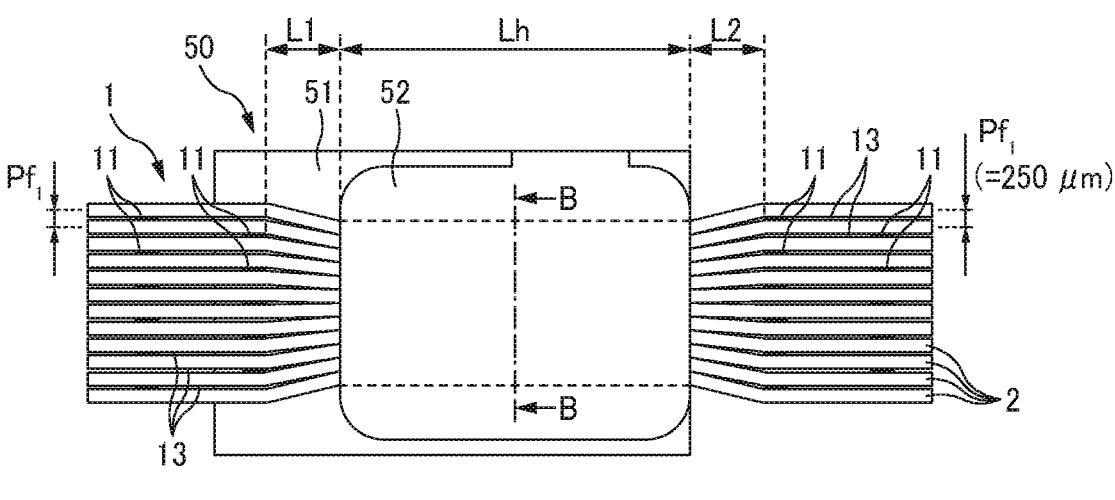
FIG. 5A
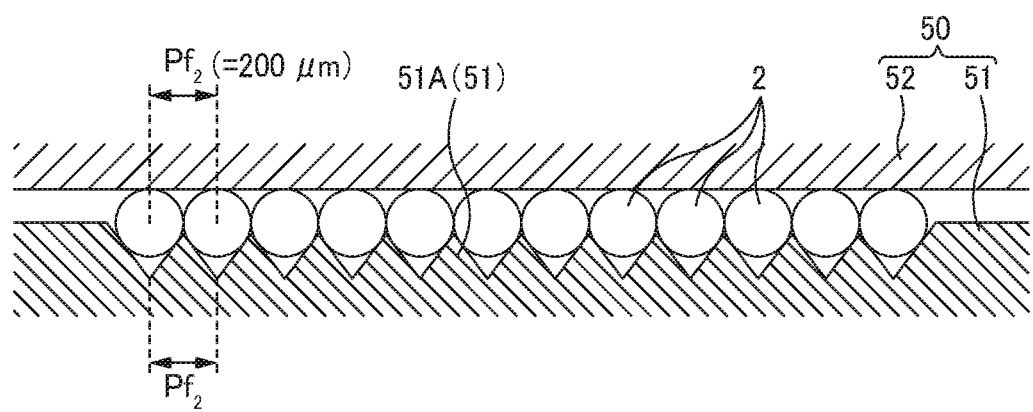
FIG. 5B
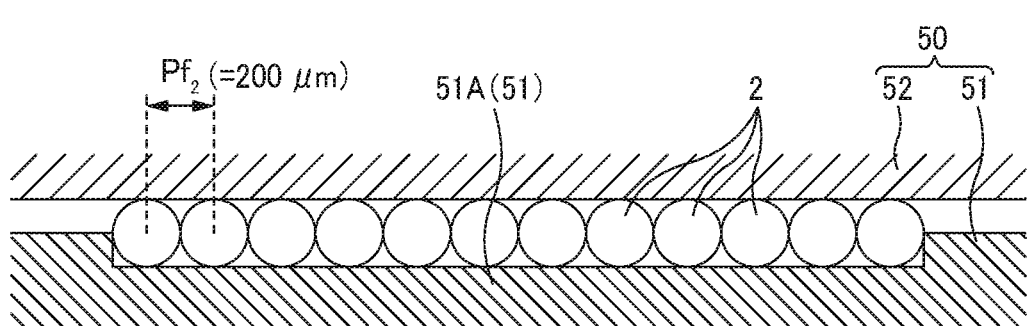
FIG. 5C (MODIFIED EXAMPLE)

LONGITUDINAL DIRECTION

LONGITUDINAL DIRECTION

LONGITUDINAL DIRECTION

OPTICAL FIBER ARRANGEMENT METHOD, OPTICAL FIBER FUSION SPLICING METHOD, METHOD FOR MANUFACTURING OPTICAL FIBER RIBBON WITH CONNECTOR, AND INTERMITTENTLY CONNECTED OPTICAL FIBER RIBBON

CROSS-REFERENCE TO RELATED APPLICATIONS

This is a divisional application of U.S. patent application Ser. No. 17/634,138, filed on Feb. 9, 2022, which is a national stage of International Patent Application No. PCT/JP2020/027217, filed on Jul. 13, 2020, which claims priority from Japanese Patent Application No. 2019-165999, filed on Sep. 12, 2019. The contents of these applications are incorporated herein by reference in their entirety.

TECHNICAL FIELD

The present invention relates to an optical fiber arrangement method, an optical fiber fusion splicing method, a method for manufacturing an optical fiber ribbon with a connector, and an intermittently connected optical fiber ribbon.

BACKGROUND

Patent Literature 1 describes a technique in which an outer diameter of optical fibers is reduced from 250 μm to 200 μm and an optical fiber ribbon is formed by arranging the optical fibers with the outer diameter of 200 μm side by side at a pitch of 250 μm. Moreover, Patent Literature 1 describes an intermittently connected optical fiber ribbon in which multiple optical fibers arranged side by side are intermittently connected to one another.

CITATION LIST

Patent Literature

PTL 1: Japanese Patent No. 5564026

When an optical fiber ribbon with a pitch of 250 μm is to be fused in one operation with a fusion splicing device for a pitch of 200 μm, optical fibers arranged side by side at the pitch of 250 μm need to be arranged at the pitch of 200 μm. In such optical fiber arrangement work, in a conventional method, an end portion of the optical fiber ribbon with the pitch of 250 μm is separated into single fibers and a holder for the pitch of 200 μm is made to hold the multiple optical fibers detached and separated into single fibers to arrange the optical fibers at the pitch of 200 μm.

However, in the work of making the holder hold the multiple optical fibers detached and separated into single fibers, handling of the optical fibers is cumbersome and workability is poor. Note that such a problem of workability is not limited to the case where the multiple optical fibers in the optical fiber ribbon with the pitch of 250 μm are arranged at the pitch of 200 μm or the case where the fusion splicing is performed in one operation, and may occur when multiple optical fibers in the optical fiber ribbon arranged side by side at a certain pitch (first pitch) is arranged at another pitch (second pitch).

SUMMARY

One or more embodiments of the present invention facilitate work of arranging optical fibers.

One or more embodiments of the present invention is an optical fiber arrangement method comprising: preparing an intermittently connected optical fiber ribbon including a plurality of optical fibers arranged side by side at a first pitch larger than a fiber diameter; reducing a width of the optical fiber ribbon in an interior of a holder by making the holder hold a non-connecting region of the optical fiber ribbon; and arranging the plurality of optical fibers, extending out from the holder, at a second pitch smaller than the first pitch by removing connecting portions in a state where the holder is holding the plurality of optical fibers, the connecting portions connecting the plurality of optical fibers extending out from the holder to each other.

Other characteristics of embodiments of the present invention will be apparent from the statements of the description and the drawings to be described later.

One or more embodiments of the present invention can facilitate work of arranging optical fibers.

BRIEF DESCRIPTION OF DRAWINGS

FIGS. 5A and 5B are diagrams illustrating how a holder 50 sandwiches the non-connecting region 30. FIG. 5B is an enlarged diagram of a B-B cross section in FIG. 5A. FIG. 5C is a diagram illustrating the holder 50 in a modified example.

DETAILED DESCRIPTION

Figure 1A:
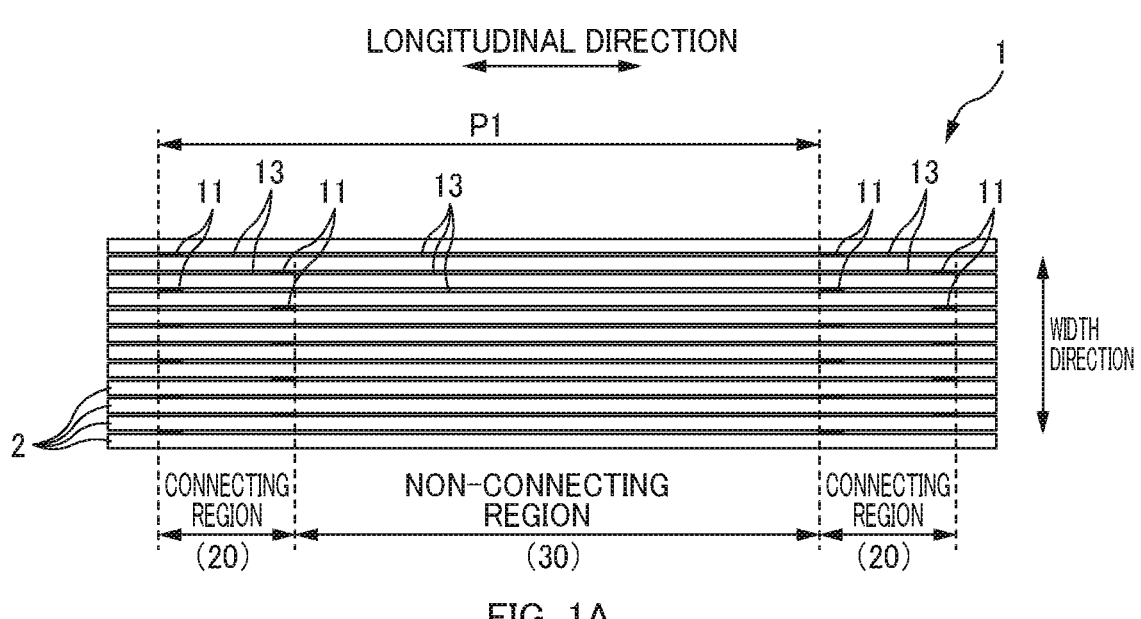
FIGS. 1A and 1B are diagrams illustrating an optical fiber ribbon 1 in one or more embodiments.

At least the following matters are apparent from the description and the drawings to be described later.

An optical fiber arrangement method will become clear comprising: preparing an intermittently connected optical fiber ribbon including a plurality of optical fibers arranged side by side at a first pitch larger than a fiber diameter; reducing a width of the optical fiber ribbon in an interior of a holder by making the holder hold a non-connecting region of the optical fiber ribbon; and arranging the plurality of optical fibers, extending out from the holder, at a second pitch smaller than the first pitch by removing connecting portions in a state where the holder is holding the plurality of optical fibers, the connecting portions connecting the plurality of optical fibers extending out from the holder to each other. According to the optical fiber arrangement method as described above, work of arranging the optical fibers is facilitated.

It is desirable to further comprise removing the connecting portions by removing coating of the plurality of optical fibers extending out from the holder in the state where the holder is holding the plurality of optical fibers. This allows removal of the connecting portions of an optical fiber ribbon and removal of the coating of the multiple optical fibers to be simultaneously performed. Accordingly, the work of arranging the optical fibers is facilitated.

It is desirable to further comprise aligning a position of the optical fiber ribbon in the holder based on a mark formed in the non-connecting region, the holder holding the non-connecting region of the optical fiber ribbon. Work of making the holder hold the non-connecting region of the optical fiber ribbon is thus facilitated.

It is desirable that a connecting region is formed by intermittently arranging a plurality of connecting sections in a longitudinal direction, the connecting sections being sections in which the connecting portions are intermittently arranged in a width direction of the optical fiber ribbon, and the number of the connecting portions arranged in the connecting section adjacent to the non-connecting region is smaller than the number of the connecting portions arranged in the connecting section not adjacent to the non-connecting region. An effect of the connecting portions in the case where the holder sandwiches the non-connecting region of the optical fiber ribbon is thus reduced. Accordingly, reduction of the width of the optical fiber ribbon is facilitated.

It is desirable that a connecting region is formed by intermittently arranging a plurality of connecting sections in a longitudinal direction, the connecting sections being sections in which the connecting portions are intermittently arranged in a width direction of the optical fiber ribbon, and a non-connecting portion is arranged on an outer side, in the width direction, of the connecting portions arranged in the connecting section adjacent to the non-connecting region. This facilitates inward displacement of the optical fibers located in end portions of the optical fiber ribbon. Accordingly, reduction of the intervals of the optical fibers in the interior of the holder is facilitated.

It is desirable that a region in which a sandwich portion of the holder sandwiches the optical fiber ribbon is the non-connecting region. The holder thus holds the non-connecting region of the optical fiber ribbon and this facilitates reduction of the width of the optical fiber ribbon in the interior of the holder.

On the other hand, a connecting region located with the connecting portions may be partially included in a region in which a sandwich portion of the holder sandwiches the optical fiber ribbon. In this case, it is desirable that the connecting region is formed by intermittently arranging a plurality of first connecting sections and a second connecting section in a longitudinal direction, the first connecting sections being sections in which the connecting portions are intermittently arranged in the width direction of the optical fiber ribbon, the second connecting section being arranged adjacent to the non-connecting region, an interval between the first connecting section and the second connecting section in the longitudinal direction is larger than an interval between the first connecting sections in the longitudinal direction, and the second connecting section is included in the region in which the sandwich portion of the holder sandwiches the optical fiber ribbon. The second connecting section sandwiched by the holder is thus arranged to be shifted toward the non-connecting region. Accordingly, reduction of the intervals of the optical fibers not bound to one another by the connecting portions in the second connecting section is facilitated.

An optical fiber fusion splicing method will become clear, comprising: arranging the plurality of optical fibers, extending out from the holder, at the second pitch smaller than the first pitch by the optical fiber arrangement method according to claim 1; then cutting to a predetermined length end portions of the plurality of optical fibers that extend out from the holder and that have been removed of coating, in the state where the holder is holding the plurality of optical fibers; and fusing the plurality of optical fibers arranged at the second pitch by using the fusion splicing device by setting the holder in a fusion splicing device, in the state where the holder is holding the plurality of optical fibers. According to the optical fiber fusion splicing method as described above, work of arranging the optical fibers is facilitated and work of fusing is thus also facilitated.

A method for manufacturing an optical fiber ribbon with a connector will become clear, comprising: arranging the plurality of optical fibers, extending out from the holder, at the second pitch smaller than the first pitch by the optical fiber arrangement method according to claim 1; then cutting to a predetermined length end portions of the plurality of optical fibers that extend out from the holder and that have been removed of coating, in the state where the holder is holding the plurality of optical fibers; and attaching the end portions of the plurality of optical fibers to the ferrule by inserting the plurality of optical fibers arranged at the second pitch into fiber holes of a ferrule, in the state where the holder is holding the plurality of optical fibers. According to the method for manufacturing an optical fiber ribbon with a connector as described above, work of arranging the optical fibers is facilitated and work of manufacturing an optical fiber ribbon with a connector is thus also facilitated.

An intermittently connected optical fiber ribbon will become clear comprising: a plurality of optical fibers arranged side by side at a pitch larger than a fiber diameter; and a plurality of connecting portions that connect adjacent two of the optical fibers to each other, the plurality of connecting portions being intermittently arranged, wherein the intermittently connected optical fiber ribbon has connecting regions in which the plurality of connecting portions are intermittently arranged to intermittently connect the plurality of optical fibers to each other, and a non-connecting region that is located between the connecting regions and in which the connecting portions are not formed. According to the optical fiber ribbon as described above, work of arranging the plurality of optical fibers, arranged side by side at the pitch larger than the fiber diameter, at a smaller pitch is facilitated.

It is desirable that a mark used for alignment of the optical fiber ribbon and a holder configured to hold the optical fiber ribbon is formed in the non-connecting region. This allows the optical fiber ribbon and the holder to be aligned based on the position of the mark and allows the holder to hold the non-connecting region of the optical fiber ribbon.

It is desirable that the connecting regions are formed by intermittently arranging a plurality of connecting sections in a longitudinal direction, the connecting sections being sections in which the connecting portions are intermittently arranged in a width direction of the optical fiber ribbon, and the number of the connecting portions arranged in the connecting section adjacent to the non-connecting region is smaller than the number of the connecting portions arranged in the connecting section not adjacent to the non-connecting region.

An effect of the connecting portions in the case where the holder sandwiches the non-connecting region of the optical fiber ribbon is thus reduced. Accordingly, reduction of the width of the optical fiber ribbon is facilitated.

It is desirable that the connecting regions are formed by intermittently arranging a plurality of connecting sections in a longitudinal direction, the connecting sections being sections in which the connecting portions are intermittently arranged in a width direction of the optical fiber ribbon, and a non-connecting portion is arranged on an outer side, in the width direction, of the connecting portions arranged in the connecting section adjacent to the non-connecting region. This facilitates inward displacement of the optical fibers located in end portions of the optical fiber ribbon. Accordingly, reduction of the width of the optical fiber ribbon in the interior of the holder is facilitated.

It is desirable that the connecting regions are formed by intermittently arranging a plurality of first connecting sections and a second connecting section in a longitudinal direction, the first connecting sections being sections in which a plurality of the connecting portions are intermittently arranged in the width direction of the optical fiber ribbon, the second connecting section being arranged adjacent to the non-connecting region, and an interval between the first connecting section and the second connecting section in the longitudinal direction is larger than an interval between the first connecting sections in the longitudinal direction. The second connecting section sandwiched by the holder is thus arranged to be shifted toward the non-connecting region. Accordingly, reduction of the intervals of the optical fibers not bound to one another by the connecting portions in the second connecting section is facilitated.

Structure of Optical Fiber Ribbon 1

Figure 1B:
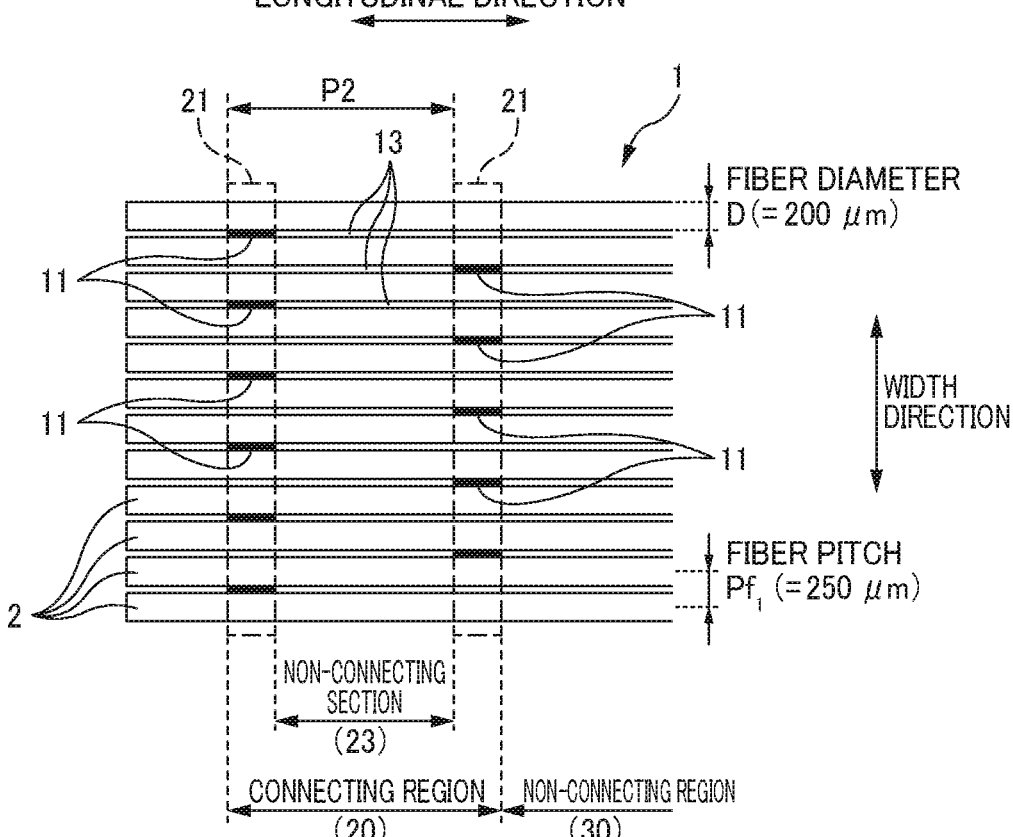

FIGS. 1A and 1B are diagrams illustrating an optical fiber ribbon 1 in one or more embodiments. FIG. 1A is a diagram illustrating connecting regions 20 and a non-connecting region 30. FIG. 1B is a diagram illustrating the connecting region 20. In FIG. 1B, arrangement of multiple connecting portions 11 formed in the connecting region 20 is illustrated.

In the following description, directions are defined as follows. As in FIGS. 1A and 1B, the longitudinal direction of the optical fiber ribbon 1 is simply referred to as "longitudinal direction". Note that a direction parallel to multiple optical fibers 2 forming the optical fiber ribbon 1 in a state where the optical fibers 2 are arranged substantially parallel to one another on a plane (illustrated state) is also sometimes referred to as "longitudinal direction". Moreover, an optical axis direction of the optical fibers 2 forming the optical fiber ribbon 1 is also sometimes referred to as "longitudinal direction". Furthermore, a direction in which the multiple optical fibers 2 are arranged side by side in the illustrated state is referred to as "width direction". Moreover, a direction perpendicular to a ribbon surface of the optical fiber ribbon 1 in the illustrated state (direction perpendicular to the surfaces of FIGS. 1A and 1B) is referred to as "ribbon thickness direction".

The optical fiber ribbon 1 in one or more embodiments is a so-called intermittently connected (intermittently fixed) optical fiber ribbon. The intermittently connected optical fiber ribbon 1 is an optical fiber ribbon in which the multiple optical fibers 2 are arranged side by side and intermittently connected to one another. Adjacent two optical fibers 2 are connected to each other by the connecting portions 11. The multiple connecting portions 11 connecting the two adjacent optical fibers 2 are intermittently arranged in the longitudinal direction. Moreover, the multiple connecting portions 11 of the optical fiber ribbon 1 are two-dimensionally, intermittently arranged in the longitudinal direction and the width direction. The connecting portions 11 are formed by applying an ultraviolet light curable resin to be an adhesive (ribbon forming material) and then irradiating the ultraviolet light curable resin with ultraviolet light to cure the ultraviolet light curable resin. Note that the connecting portions 11 may also be formed by using a thermoplastic resin. Regions between the two adjacent optical fibers 2 other than the connecting portions 11 are non-connecting portions 13 (separated portions). The two adjacent optical fibers 2 are not bound to each other in the non-connecting portions 13. The non-connecting portions 13 are arranged in the width direction of the connecting portions 11. The optical fiber ribbon 1 can be folded or rolled into a cylindrical shape (bundle shape) and is capable of densely housing many optical fibers 2.

Note that the intermittently connected optical fiber ribbon 1 is not limited to the configuration illustrated in FIG. 1A. For example, the fiber count (number of optical fibers 2) of the optical fiber ribbon 1 may be changed. Moreover, the arrangement of the connecting portions 11 may be changed within a scope not departing from the gist of the present application.

In one or more embodiments, multiple optical fibers 2 are arranged side by side at intervals larger than an outer diameter of the optical fibers 2. In this example, the outer diameter (fiber diameter D) of the optical fibers 2 is 200 μm and each of the intervals of the optical fibers 2 in the width direction (first fiber pitch Pf1) is 250 μm. In the following description, the outer diameter of the optical fibers 2 is sometimes referred to as "fiber diameter D". Moreover, in the following description, the intervals of the optical fibers 2 in the optical fiber ribbon 1 in the width direction are sometimes referred to as "first fiber pitch Pf1". Note that the fiber diameter D is not limited to 200 μm and may be any diameter equal to or smaller than 220 μm. Moreover, the first fiber pitch Pf1 is not limited to 250 μm and may be any pitch that is 250±30 μm (within a range of 220 μm to 280 μm) and in which two adjacent optical fibers 2 are not in contact with each other.

As illustrated in FIG. 1A, the intermittently connected optical fiber ribbon 1 is located with the connecting regions 20 and the non-connecting regions 30. The connecting regions 20 are each a region in which multiple connecting portions 11 are formed to connect all optical fibers 2 (12 optical fibers 2 in this example) to one another. The non-connecting regions 30 are each a region that is located between the connecting region 20 and the connecting region 20 and that includes no connecting portions 11. The connecting regions 20 and the non-connecting regions 30 are alternately formed in the longitudinal direction. In other words, each non-connecting region 30 is formed between the connecting region 20 and the connecting region 20, and each connecting region 20 is formed between the non-connecting region 30 and the non-connecting region 30. As illustrated in FIG. 1A, the connecting regions 20 are repeatedly arranged in the longitudinal direction at predetermined intervals P1. In the following description, the intervals of the connecting regions 20 in the longitudinal direction are sometimes referred to as "region pitch P1".

As illustrated in FIG. 1B, each connecting region 20 is located with multiple connecting sections 21. In this example, two connecting sections 21 are located in one connecting region 20. Five to six connecting portions 11 are intermittently formed in the width direction in each connecting section 21. The connecting portions 11 and the non-connecting portions 13 are alternately formed in the width direction in each connecting section 21. The positions of the connecting portions 11 vary between the connecting sections 21. Specifically, the multiple connecting portions 11 in the connecting sections 21 are arranged staggered in the width direction. Two adjacent optical fibers 2 are thereby connected to each other by at least one connecting portion 11 in each connecting region 20 and all optical fibers 2 are intermittently connected to one another by the multiple connecting portions 11 belonging to one connecting region 20. Note that i is not limited to 2 and may be 3 or more (to be described later), where i is the number of the connecting sections 21 in one connecting region 20. Moreover, j is not limited to 5 to 6 and may be other numbers (to be described later), where j is the number of connecting portions 11 in one connecting section 21.

A non-connecting section 23 in which no connecting portions 11 are present in the width direction is located between the connecting section 21 and the next connecting section 21. As illustrated in FIG. 1B, multiple (two in this example) connecting sections 21 in each connecting region 20 are arranged at a predetermined interval P2 in the longitudinal direction. In the following description, the interval of the connecting sections 21 in the connecting region 20 in the longitudinal direction is sometimes referred to as "section pitch P2". Since the section pitch P2 is larger than the dimension of the connecting portions 11 in the longitudinal direction, the non-connecting section 23 is formed between the connecting section 21 and the next connecting section 21. Note that the length of the non-connecting region 30 in the longitudinal direction is set to be larger than the section pitch P2.

Figure 2A:
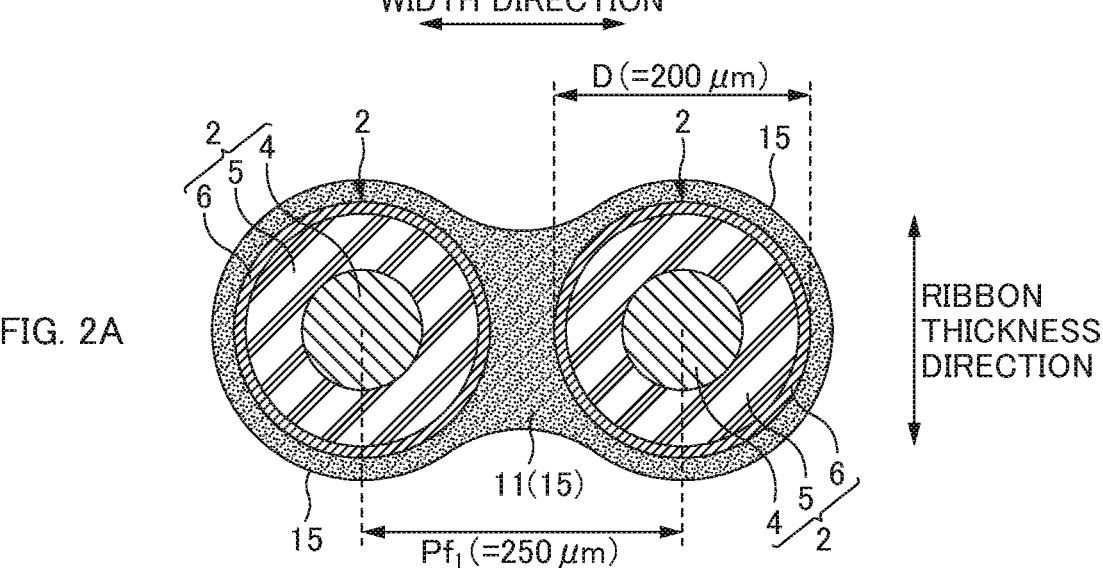
FIG. 2A is a cross-sectional view of two optical fibers 2 connected to each other by a connecting portion 11 and is a cross-sectional view of a portion in which the connecting portion 11 is formed.

FIG. 2A is a cross-sectional view of two optical fibers 2 connected to each other by the connecting portion 11 and is a cross-sectional view of a portion in which the connecting portion 11 is formed.

Each optical fiber 2 includes a bare optical fiber 4, a coating layer 5, and a colored layer 6. The bare optical fiber

4 is formed of a core and a clad. The coating layer 5 is a layer coating the bare optical fiber 4. The coating layer 5 is formed of, for example, a primary coating layer (primary coat) and a secondary coating layer (secondary coat). The colored layer 6 is a layer formed on a surface of the coating layer 5. The colored layer 6 is formed by applying a colorant on a surface of the coating layer 5.

The two adjacent optical fibers 2 are connected to each other by a ribbon forming material (ultraviolet light curable resin; coupling agent) forming the connecting portion 11. A ribbon forming material layer 15 made of the ribbon forming material is formed on the entire peripheries of the colored layers 6. The ribbon forming material layer 15 made of the ribbon forming material is also formed on surfaces of the colored layers 6 over the entire region of the optical fibers 2 in the longitudinal direction. The connecting portion 11 has a recessed shape in a portion in the middle of the two optical fibers 2.

Figure 2B:
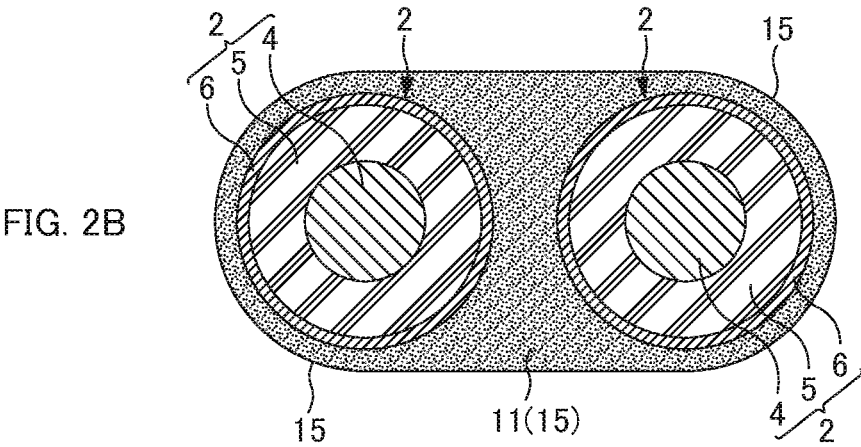
FIG. 2B is a diagram illustrating the connecting portion 11 in a first modified example.

FIG. 2B is a diagram illustrating the connecting portion 11 in a first modified example. As illustrated in the first modified example, the connecting portion 11 does not have to be recessed in the portion in the middle of the two optical fibers 2.

Figure 2C:
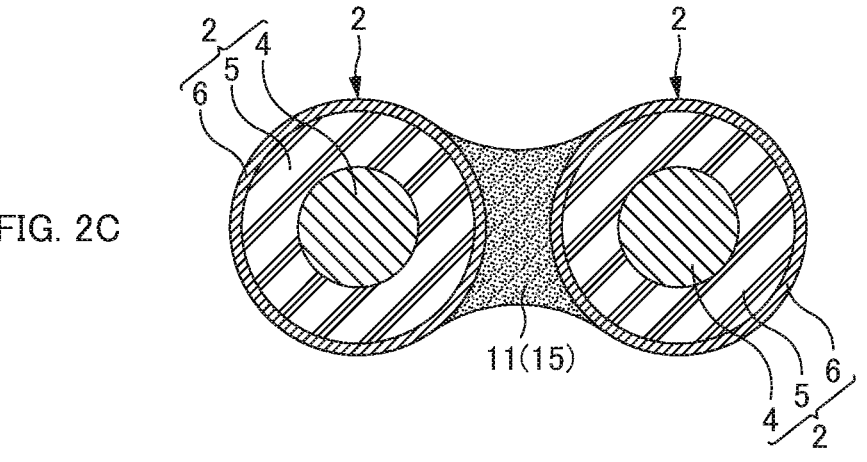
FIG. 2C is a diagram illustrating the connecting portion 11 in a second modified example.

FIG. 2C is a diagram illustrating the connecting portion 11 in a second modified example. As illustrated in the second modified example, the ribbon forming material layer 15 made of the ribbon forming material does not have to be formed on the entire peripheries of the colored layers 6. According to the second modified example, the diameter of the optical fibers 2 can be further reduced.

Note that the connecting portion 11 (or the ribbon forming material layer 15) does not have to be formed both above and below a line coupling the centers of the two adjacent optical fibers 2 and may be formed only above or below the line coupling the centers of the two adjacent optical fibers 2. Moreover, the connecting portion 11 (or the ribbon forming material layer 15) does not have to be evenly formed above and below the line coupling the centers of the two adjacent optical fibers 2.

Figure 3:
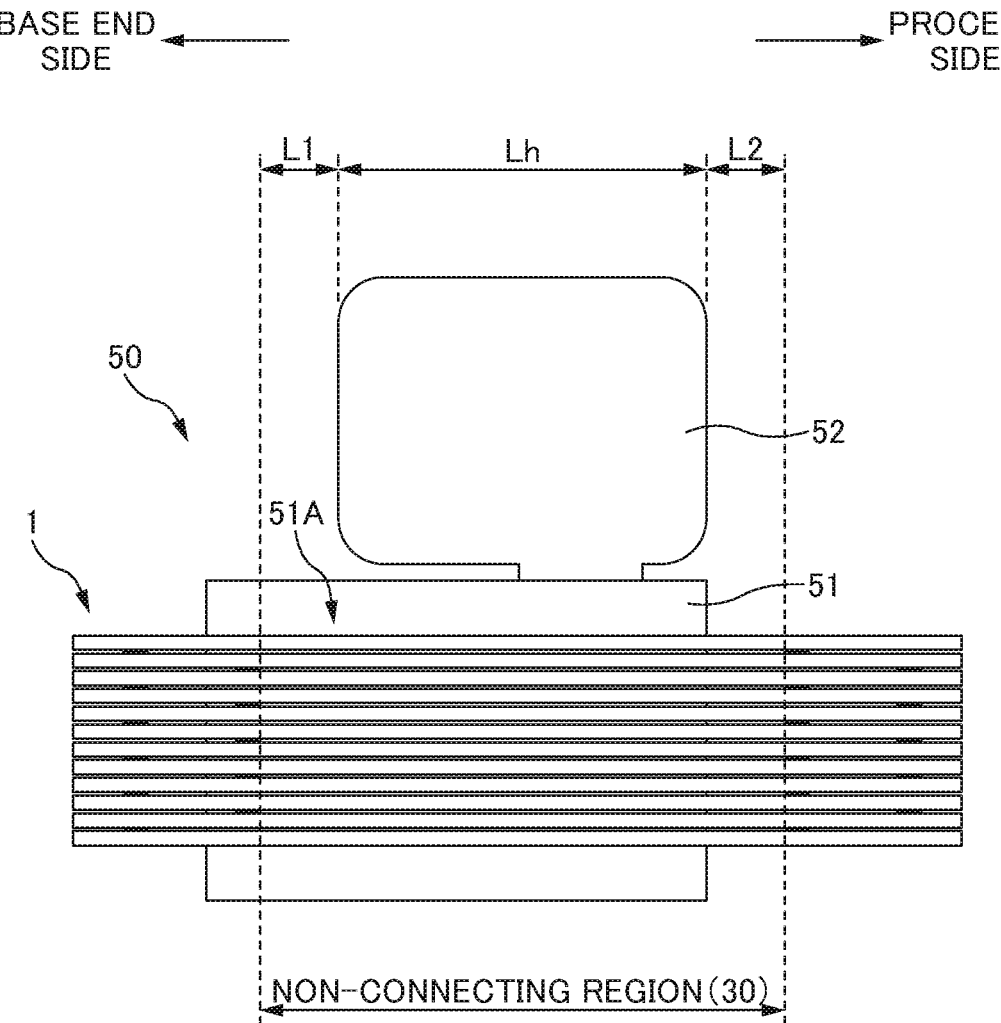
FIG. 3 is a diagram illustrating a relationship between a holder 50 and a length of a non-connecting region 30 of the optical fiber ribbon 1.

FIG. 3 is a diagram illustrating a relationship between a holder 50 and the length of the non-connecting region 30 of the optical fiber ribbon 1.

The holder 50 is a member that holds the optical fiber ribbon 1. The holder 50 includes a base 51 and a lid 52.

The base 51 is a member on which the optical fiber ribbon 1 is placed, and includes a placing surface 51A for placing the optical fiber ribbon 1. V-grooves (see FIG. 5B) for arranging the optical fibers 2 at a predetermined pitch is formed on the placing surface 51A.

The lid 52 is a member that can be closed and opened relative to the base 51. When the lid 52 is closed, the optical fiber ribbon 1 is sandwiched (held) between the placing surface 51A of the base 51 and the lid 52. The placing surface 51A of the base 51 and the lid 52 thus form a sandwich portion that sandwiches the optical fiber ribbon 1. In this case, the length Lh of the sandwich portion in the longitudinal direction is defined by the width (dimension in the longitudinal direction) of the lid 52. Note that, when a pad configured to come into contact with the optical fiber ribbon 1 is located on an inner surface of the lid 52, the length Lh of the sandwich portion in the longitudinal direction is defined by the width (dimension in the longitudinal direction) of the pad instead of the width (dimension in the longitudinal direction) of the lid 52.

Note that, when the lid 52 is closed and the holder 50 holds the optical fiber ribbon 1, the optical fibers 2 extend out from both sides of the holder 50 (or the sandwich portion). In the following description, out of the sides where the optical fibers 2 extend out from the holder 50, a side where portions of the optical fibers 2 to be processed later (portions to be subjected to coating removal or to be cut: distal end portions of the optical fibers 2) extend out from the holder 50 is referred to as "process side" and the opposite side to the above side is referred to as "base end side" in some cases.

In one or more embodiments, the length of the non-connecting region 30 of the optical fiber ribbon 1 is set to be larger than the width Lh (dimension in the longitudinal direction) of the sandwich portion. Accordingly, in one or more embodiments, the configuration is such that the sandwich portion can sandwich the non-connecting region 30 of the optical fiber ribbon 1 (configuration is such that it is possible to make the holder 50 hold the optical fiber ribbon 1 while preventing the sandwich portion from sandwiching the region in which the connecting portions 11 are formed). Accordingly, as described later, when the holder 50 is made to hold the optical fiber ribbon 1, the gaps between the multiple optical fibers 2 in an interior (sandwich portion) of the holder 50 can be made smaller than the first fiber pitch Pf1 more easily, and reduction of the width of the optical fiber ribbon 1 is facilitated (see FIG. 5B).

Moreover, in one or more embodiments, when the sandwich portion sandwiches the non-connecting region 30 of the optical fiber ribbon 1, the non-connecting region 30 of the optical fiber ribbon 1 extends out from both sides of the sandwich portion (see also FIG. 5A). In this description, L1 is a length, in the longitudinal direction, of the non-connecting region 30 extending out from the base end side of the sandwich portion (left side in FIG. 3 (or FIG. 5A)) in the case where the sandwich portion sandwiches the non-connecting region 30 of the optical fiber ribbon 1 and L2 is a length, in the longitudinal direction, of the non-connecting region 30 extending out from the process side (right side in FIG. 3 (or FIG. 5A)) of the holder 50. As described later, the length L1 is desirably set to such a length that a bending radius of the optical fibers 2 is larger than an allowable bending radius R (a predetermined bending radius R) when the holder 50 holds the optical fibers 2. Specifically, the length L1 is desirably 9.42 mm or more. Moreover, the length L2 is desirably such a length that paired blades 61A of a coating removal device 60 can nip a portion of the non-connecting region 30. Specifically, the length L2 is desirably 2 mm or more. Accordingly, the length of the non-connecting region 30 of the optical fiber ribbon 1 is desirably larger than a length obtained by adding the length L1 and the length L2 to the width Lh of the sandwich portion (Lh+L1+L2), specifically, larger than a length obtained by adding 11.42 mm to the length Lh (Lh+11.42 mm).

Fusion Splicing Method of Optical Fibers 2

Figure 4:
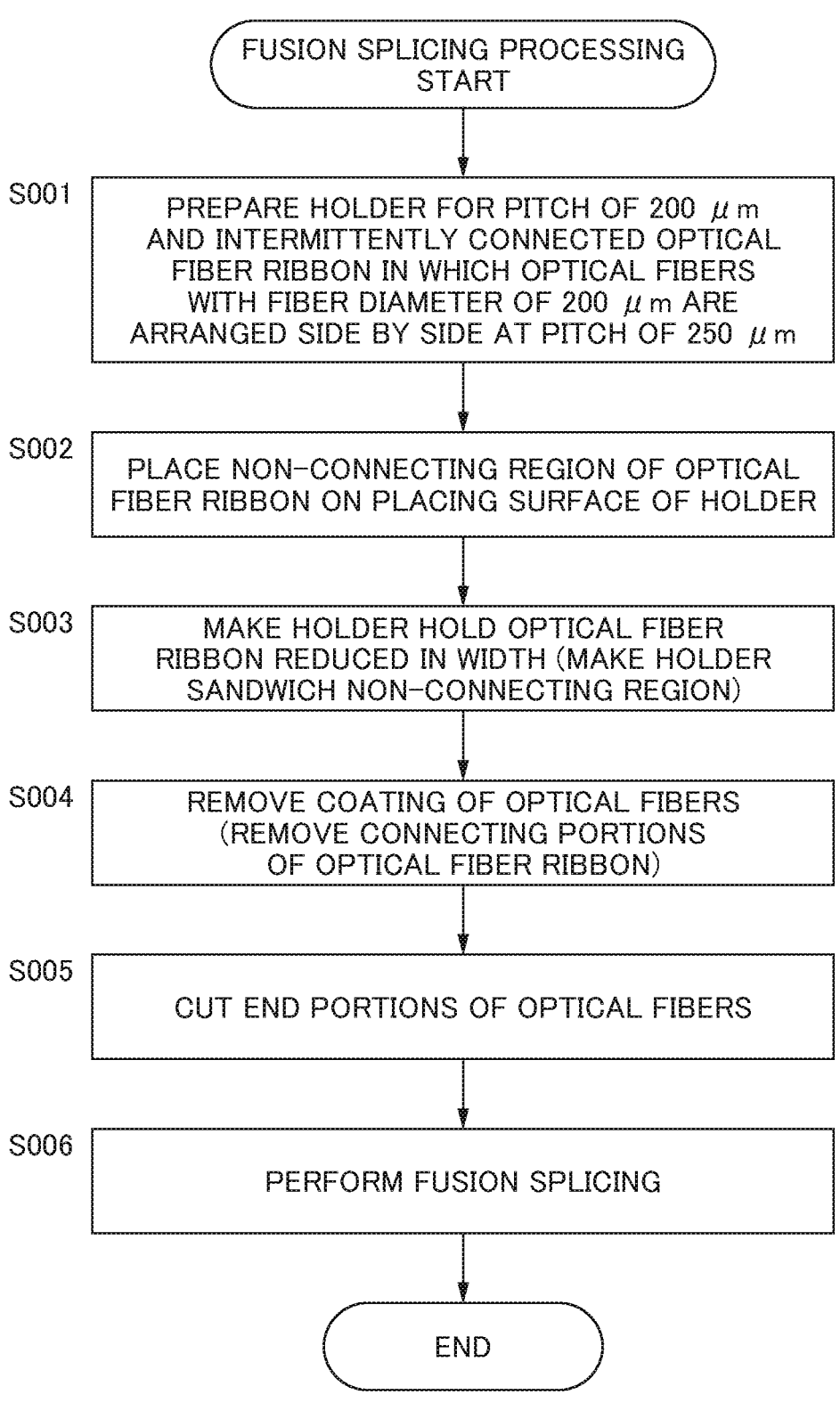
FIG. 4 is a flowchart of processing performed when the optical fiber ribbon 1 with a pitch of 250 μm is fused in one operation with a fusion splicing device 40 for a pitch of 200 μm.

FIG. 4 is a flowchart of processing performed when the optical fiber ribbon 1 in which the optical fibers 2 with the fiber diameter of 200 µm are arranged side by side at the pitch of 250 µm and intermittently connected to one another is fused in one operation with a fusion splicing device 40 for the pitch of 200 µm. Note that FIG. 4 also includes a processing flow (S001 to S004) of arranging the optical fibers 2 at the pitch of 200 µm, the optical fibers 2 forming the optical fiber ribbon 1 in which the optical fibers 2 with the fiber diameter of 200 µm are arranged side by side at the pitch of 250 µm and intermittently connected to one another. In the following description, the intervals of the optical fibers 2 in the width direction for the one-operation fusing with the fusion splicing device 40 are sometimes referred to as "second fiber pitch Pf2". Note that the second fiber pitch Pf2 only needs to be smaller than the first fiber pitch Pf1 and is not limited to 200 µm.

First, a worker prepares the holder 50 for the pitch of 200 µm and the optical fiber ribbon 1 with the pitch of 250 µm that is the target of fusion splicing (S001). In other words, the worker prepares the optical fiber ribbon 1 with the first fiber pitch Pf1 and the holder 50 for the second fiber pitch Pf2. In this case, the worker prepares the optical fiber ribbon 1 illustrated in FIG. 1A as the optical fiber ribbon 1 with the pitch of 250 µm. The holder 50 for the pitch of 200 µm is a holder for setting the optical fiber ribbon 1 in the fusion splicing device 40 for the pitch of 200 µm. Multiple V-grooves (to be described later: see FIG. 5B) are formed at the pitch of 200 µm (second fiber pitch Pf2) on the placing surface 51A of the base 51 of the holder 50 in one or more embodiments.

Next, the worker places the non-connecting region 30 of the optical fiber ribbon 1 on the placing surface 51A of the holder 50 (S002). In one or more embodiments, as illustrated in FIG. 3, the length of the non-connecting region 30 of the optical fiber ribbon 1 is set to be larger than the width Lh of the lid 52 and the worker places the non-connecting region 30 of the optical fiber ribbon 1 on the placing surface 51A of the holder 50 such that the non-connecting region 30 of the optical fiber ribbon 1 faces the lid 52.

When the non-connecting region 30 of the optical fiber ribbon 1 is placed on the placing surface 51A of the holder 50, end portions (right portions in the drawings) of the optical fibers 2 extend out to the outer side (right side in the drawings) of the holder 50. Moreover, in one or more embodiments, when the non-connecting region 30 of the optical fiber ribbon 1 is placed on the placing surface 51A of the holder 50, a portion (right portion in the drawings) of the non-connecting region 30 extend out to the outer side (right side in the drawings) of the holder 50.

Next, the worker closes the lid 52 and makes the holder 50 hold the optical fiber ribbon 1 (S003). Since the non-connecting region 30 of the optical fiber ribbon 1 is placed on the placing surface 51A of the holder 50 to face the lid 52 in S002, the placing surface 51A of the base 51 and the lid 52 sandwich the non-connecting region 30 of the optical fiber ribbon 1 when the lid 52 is closed in S003. The worker may make the holder 50 hold the optical fiber ribbon 1 while making the non-connecting region 30 of the optical fiber ribbon 1 narrower in the width direction (while reducing the intervals of the multiple optical fibers 2 in the non-connecting region 30) with fingers as necessary.

FIGS. 5A and 5B are diagrams illustrating how the holder 50 sandwiches the non-connecting region 30. FIG. 5B is an enlarged diagram of a B-B cross section in FIG. 5A.

Since no connecting portions 11 are formed in the non-connecting region 30 of the optical fiber ribbon 1, portions between the optical fibers 2 are non-connecting portions 13 (separated portions) and the optical fibers 2 are not bound to each other in the non-connecting region 30. Accordingly, when the holder 50 sandwiches the non-connecting region 30, the intervals of the multiple optical fibers 2 in the non-connecting region 30 decrease according to the pitch (second fiber pitch Pf2) of the V-grooves on the placing surface 51A. Making the holder 50 hold the non-connecting region 30 of the optical fiber ribbon 1 thus allows the multiple optical fibers 2 to be arranged at a pitch smaller than the first fiber pitch Pf1 (=250 µm) in the interior of the holder 50 (specifically, interior of the sandwich portion of the holder 50) and the width of the optical fiber ribbon 1 can be reduced.

FIG. 5C is a diagram illustrating the holder 50 in a modified example. Paired step portions are formed on the placing surface 51A of the holder 50 in the modified example. The paired step portions define an interval between the optical fibers 2 at both ends in the width direction and the multiple optical fibers 2 are thereby arranged at the pitch of 200 μm. As described above, the placing surface 51A of the holder 50 for the pitch of 200 μm is not limited to the placing surface 51A including the V grooves at the pitch of 200 μm and may have other shapes. In other words, the placing surface 51A only needs to reduce the gaps between the multiple optical fibers 2 and reduce the width of the optical fiber ribbon 1 in the interior of the holder 50 when the holder 50 holds the non-connecting region 30 of the optical fiber ribbon 1.

As illustrated in FIG. 5A, when the holder 50 sandwiches the non-connecting region 30 of the optical fiber ribbon 1, the optical fibers 2 extend out from both sides of the sandwich portion. Moreover, in one or more embodiments, when the holder 50 sandwiches the non-connecting region 30 of the optical fiber ribbon 1, the non-connecting region 30 partially extend out from the sandwich portion. In this example, the non-connecting region 30 extends out from the base end side of the sandwich portion by the length L1 and extends out from the process side of the holder 50 by the length L2.

In step S003, as illustrated in FIG. 5A, outside the lid (outside the sandwich portion), the 52 of the holder 50 connecting portions 11 are present between the optical fibers 2 and the intervals between the optical fibers 2 are fixed to 250 μm in the connecting portions 11. Accordingly, in the step S003, the multiple optical fibers 2 outside the lid 52 of the holder 50 (outside the sandwich portion) are affected by the connecting portions 11 and are thus arranged substantially at the first fiber pitch Pf1.

Next, the worker removes the coating of the optical fibers 2 (S004).

Figure 6A:
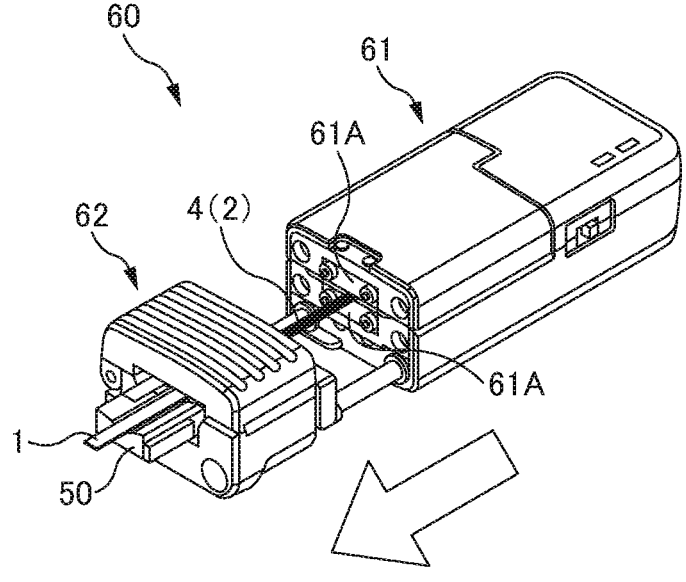
FIG. 6A is a diagram illustrating how a coating removal device 60 removes coating of the optical fibers 2.

FIG. 6A is a diagram illustrating how the coating removal device 60 removes the coating of the optical fibers 2.

The coating removal device 60 is a device that removes the coating of the multiple optical fibers 2 forming the optical fiber ribbon 1. The coating removal device 60 is a so-called hot jacket stripper. The coating removal device 60 includes a main body portion 61 that has the paired blades 61A and a grip portion 62 that grips the holder 50. The worker sets the holder 50 holding the optical fiber ribbon 1 in the grip portion 62 of the coating removal device 60, forms cuts in the coating of the optical fibers 2 by nipping the optical fibers 2 (optical fiber ribbon 1) with the paired blades 61A of the main body portion 61, then separates the main body portion 61 and the grip portion 62 from each other to pull out the coating of the optical fibers 2 with the paired blades 61A, and thereby removes the coating of the optical fibers 2. In one or more embodiments, the portion (right portion in the drawings) of the non-connecting region 30 extends to the outer side (in the drawings, the right side: process side) of the holder 50 and the paired blades 61A nip the optical fibers 2 (optical fiber ribbon 1) in this portion of the non-connecting region 30 to remove the coating of the optical fibers 2 on the end portion side of the nipped portion.

When the holder 50 is set in the grip portion 62 of the coating removal device 60, the connecting portions 11 are present between the multiple optical fibers 2 extending out from the holder 50 (see FIG. 5A). Since the connecting portions 11 are arranged outside the coating layers 5 of the optical fibers 2 (see FIG. 2A), the connecting portions 11 (ribbon forming material layer 15) of the optical fiber ribbon 1 are removed together with the coating of the optical fibers 2 when the coating removal device 60 removes the coating of the optical fibers 2. Specifically, when the coating removal device 60 removes the coating of the optical fibers 2, the multiple optical fibers 2 (bare optical fibers 4) are separated into single fibers.

Figure 6B:
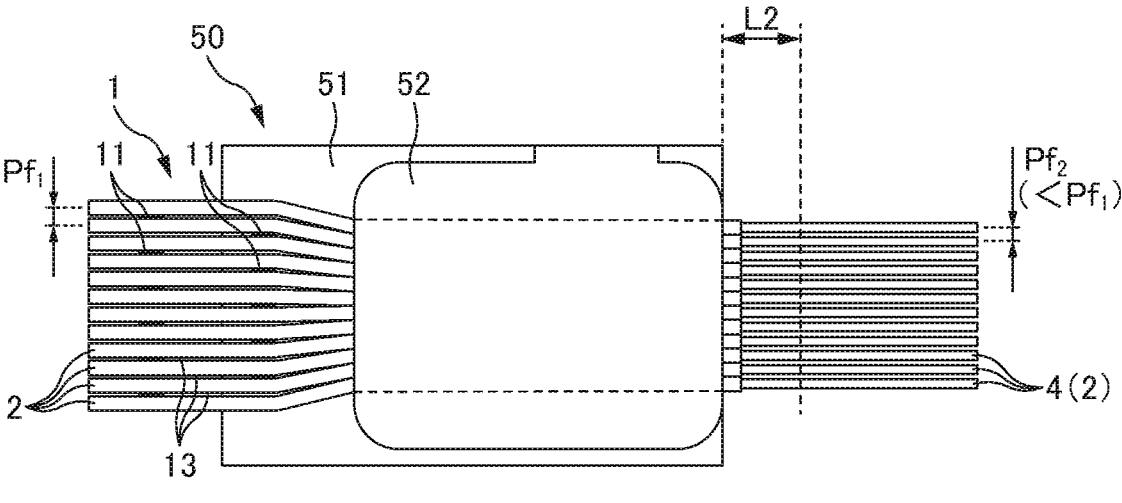
FIG. 6B is a diagram illustrating the optical fiber ribbon 1 held by the holder 50 and subjected to the coating removal.

FIG. 6B is a diagram illustrating the optical fiber ribbon 1 held by the holder 50 and subjected to the coating removal.

The multiple optical fibers 2 (bare optical fibers 4) extend out from the process side (right side in FIG. 6B) of the holder 50. On the process side (right side in FIG. 6B) of the holder 50, bounding of the optical fibers 2 by the connecting portions 11 is eliminated by the removal of the connecting portions 11. As a result, an effect of the connecting portions 11 on the process side (right side in FIG. 6B) of the holder 50 disappears and the intervals of the multiple optical fibers 2 (bare optical fibers 4) thereby become the second fiber pitch Pf2 (=200 μm) according to the pitch of the V-grooves on the placing surface 51A. Specifically, the removal of the coating of the optical fibers 2 in S004 causes the optical fibers 2 (bare optical fibers 4) to be arranged at the second fiber pitch Pf2 on the process side (right side in FIG. 6B) of the holder 50 (Note that the optical fibers 2 are affected by the connecting portions 11 and are thus arranged at the first fiber pitch Pf1 on the base end side (left side in FIG. 6B) of the holder 50).

In one or more embodiments, removing the coating of the multiple optical fibers 2 extending out from the process side (right side in FIG. 6B) of the holder 50 removes the connecting portions 11 of the optical fiber ribbon and the multiple optical fibers on the process side (right side in FIG. 6B) of the holder 50 are thereby arranged at the second fiber pitch Pf2. Note that, even if the coating of the optical fibers 2 is not removed, removing the connecting portions 11 of the optical fiber ribbon 1 extending out from the process side (right side in FIG. 6B) of the holder 50 allows the multiple optical fibers 2 extending out from the process side (right side in FIG. 6B) of the holder 50 to be separated into single fibers and allows the multiple optical fibers to be arranged at the second fiber pitch Pf2. Meanwhile, since the removal of the connecting portions 11 of the optical fiber ribbon and the removal of the coating of the multiple optical fibers 2 can be performed simultaneously by using the coating removal device 60 as in one or more embodiments, the work of arranging the optical fibers is facilitated.

In FIG. 6B, a distance from the process-side end portion of the holder 50 to an edge of a coating removed portion is 2 mm. The edge of the coating removed portion corresponds to a portion where the paired blades 61A of the coating removal device 60 have nipped the portion of the non-connecting region 30 and formed cuts in the coating. As illustrated in FIG. 6B, the aforementioned length L2 (see FIG. 5A: the length, in the longitudinal direction, of the non-connecting region 30 extending out from the process side of the holder 50) is desirably larger than the distance from the process-side end portion of the holder 50 to the edge of the coating removed portion (portion where the paired blades 61A of the coating removal device 60 form cuts in the coating). Specifically, the length L2 is desirably 2 mm or more.

After the removal of the coating of the optical fibers 2, the worker cuts end portions of the optical fibers 2 such that the bare optical fibers 4 have a predetermined length (S005). Generally, the worker sets the holder 50 holding the optical fiber ribbon 1 in a fiber cutter and uses the fiber cutter to cut the end portions of the optical fibers 2.

Next, the worker performs fusion splicing of the multiple optical fibers 2 by using the fusion splicing device 40 (S006). The worker sets the holders 50 holding the optical fiber ribbons 1 in the fusion splicing device 40 and uses the fusion splicing device 40 to fusion-splice the optical fibers 2 of the optical fiber ribbons 1 to one another.

Figure 7:
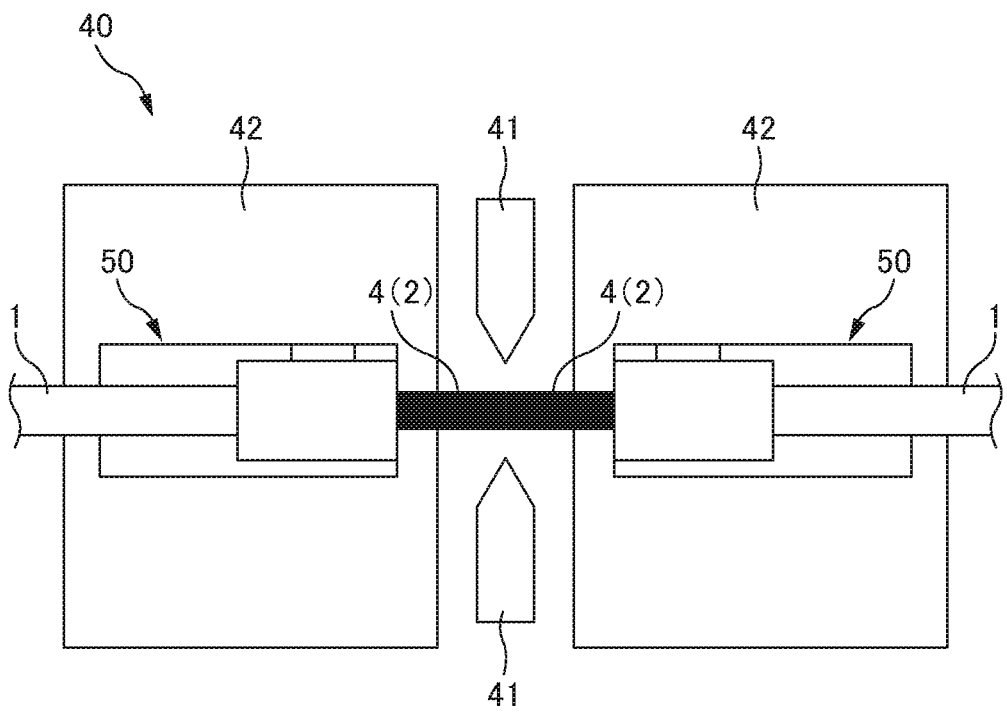
FIG. 7 is a diagram illustrating how fusion splicing is performed.

FIG. 7 is a diagram illustrating how the fusion splicing is performed.

The fusion splicing device 40 includes an electrode portion 41 and paired holder set portions 42. The electrode portion 41 includes paired electrodes for the fusion splicing of the optical fibers 2. Arc discharge is made to occur in the electrode portion 41 to heat and melt distal end portions of the optical fibers 2, and the optical fibers 2 are thereby fusion-spliced to one another. The holder set portions 42 are each a portion (holder placing portion) where the holder 50 is set. The holder set portions 42 are configured to be movable to allow alignment of the optical fibers 2 in the fusion splicing.

As illustrated in FIG. 7, the worker sets the holders 50 in the respective holder set portions 42 with the holders 50 holding the multiple optical fibers 2. When the holders 50 are set in the respective paired holder set portions 42, end surfaces of the optical fibers 2 (bare optical fibers 4) extending out from the process sides of the holders 50 are arranged to face one another in the electrode portion 41.

The fusion splicing device 40 of one or more embodiments is the fusion splicing device 40 for the pitch of 200 μm and is configured to fuse the multiple optical fibers 2 arranged at the pitch of 200 μm in one operation. In one or more embodiments, since the optical fibers 2 (bare optical fibers 4) are arranged at the second fiber pitch Pf2 on the process side (the electrode portion 41 side in the case where the holder 50 is set in the holder set portion 42) of each holder 50, the optical fiber ribbons 1 with the pitch of 250 μm can be fused in one operation with the fusion splicing device 40 for the pitch of 200 μm.

Regarding Length L1

As illustrated in FIG. 5A, when the holder 50 sandwiches the non-connecting region 30 of the optical fiber ribbon 1, the multiple optical fibers 2 are arranged at the first fiber pitch Pf1 outside the holder 50 (outside the sandwich portion) but are arranged at the second fiber pitch Pf2 inside the holder 50 (inside the sandwich portion). Accordingly, when the holder 50 sandwiches the non-connecting region 30 of the optical fiber ribbon 1, the optical fibers 2 curve near both ends of the holder 50 (sandwich portion). Particularly, on the base end side of the sandwich portion, since the optical fibers 2 continues to curve for a long period, the bending radius of the optical fibers 2 is desirably set to the allowable bending radius or more. Moreover, since a curve of an optical fiber 2 at the endmost position (first or N-th fiber in the case where the optical fiber ribbon 1 includes N fibers) among the multiple optical fibers 2 forming the optical fiber ribbon 1 is the sharpest, the bending radius of the optical fiber 2 at the endmost position is desirably set to the allowable bending radius or more. The minimum value L0 of the length L1 required for the bending radius of the optical fiber to be an allowable radius is described herein.

Figure 8:
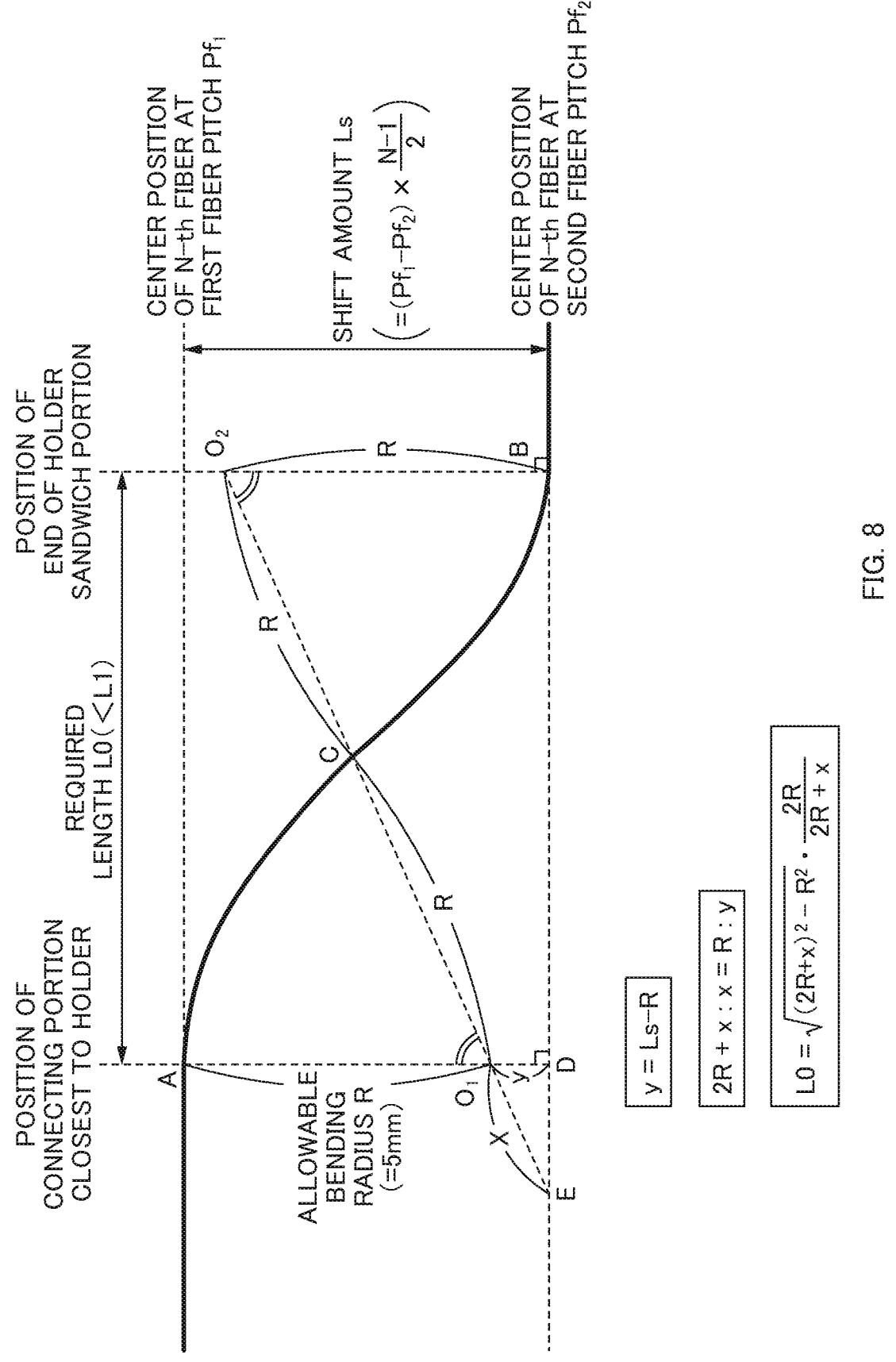
FIG. 8 is a model diagram of a curve of an N-th fiber.

FIG. 8 is a model diagram of a curve of the N-th fiber. The curved solid line in FIG. 8 illustrates the center of the N-th fiber.

Each optical fiber 2 curves in a section from the position of the connecting portion 11 closest to the sandwich portion of the holder 50 to the end (base end side end) of the sandwich portion of the holder 50 (see FIG. 5A). The point A in FIG. 8 illustrates the center position of the N-th fiber at the position of the connecting portion 11 closest to the sandwich portion of the holder 50 in the longitudinal direction. The multiple optical fibers 2 are arranged side by side at the first fiber pitch Pf1 on the base end side (left side in FIG. 8) of the point A. The point B of FIG. 8 illustrates the center position of the N-th fiber at the end of the sandwich portion of the holder 50. The multiple optical fibers 2 are arranged side by side at the second fiber pitch Pf2 on the process side (right side in FIG. 8) of the point B. Each optical fiber 2 is curved in an S-shape between the point A and the point B. The point C is the center of a portion curved in the S-shape. In this example, the optical fiber 2 is assumed to curve at the allowable bending radius R while protruding upward in the drawings, between A and C. The point O1 is the center of bending of the optical fiber 2 curved between A and C. The point O1 is at the position of the connecting portion 11 closest to the sandwich portion of the holder 50 in the longitudinal direction. Moreover, the optical fiber 2 curves at the allowable bending radius R while protruding downward in the drawings, between C and B. The point O2 is the center of bending of the optical fiber 2 curved between C and B. The point O2 is located at the end of the sandwich portion of the holder 50. Furthermore, as illustrated in FIG. 8, an intersection between a line coupling the point A and the point O1 and an extended line of the center line of the N-th fiber in the case where the optical fibers 2 are arranged side by side at the second fiber pitch Pf2 is referred to as point D. Moreover, an intersection between a line coupling the point O2 and the point O1 and the extended line of the center line of the N-th fiber in the case where the optical fibers 2 are arranged side by side at the second fiber pitch Pf2 is referred to as point E. In this example, y is a distance between O1 and D and x is a distance between O1 and E.

The curve illustrated in FIG. 8 causes the position of the N-th fiber in the width direction to change by a shift amount Ls. The shift amount Ls corresponds to a value obtained by subtracting a coordinate of the point B in the width direction from a coordinate of the point A in the width direction. Accordingly, Ls is as in the following formula.

$$Ls=(Pf1-Pf2)\times(N-1)/2$$

The first fiber pitch Pf1 and the second fiber pitch Pf2 in the aforementioned formula are known values. Moreover, N in the aforementioned formula is the fiber count (number of the optical fibers 2) of the optical fiber ribbon 1 and is thus a known value. Accordingly, the shift amount Ls can be calculated by using the aforementioned formula.

The distance y corresponds to a value obtained by subtracting the allowable bending radius R from the shift amount Ls (see FIG. 8). The allowable bending radius R is specified to be 5 mm and is a known value. Accordingly, the distance y can be calculated as y=Ls−R.

As illustrated in FIG. 8, the triangle EBO2 is similar to the triangle EDO1. Accordingly, a ratio of the length between E and O2 to the length between E and O1 is the same as a ratio of the length between B and O2 to the length between D and O1. Specifically, a relationship of 2R+x:x=R:y is established. The distance x can be calculated from R and y based on this relationship.

The length L0 required to make the bending radius of the optical fiber 2 larger than the allowable bending radius R when the holder 50 holds the optical fiber 2 corresponds to the length between D and B in FIG. 8. Accordingly, the length L0 can be expressed by the following formula and calculated from R and x.

$$L0 = \sqrt{(2R+x)^2 - R^2} \cdot \frac{2R}{2R+x}$$ [Math 1]

In one or more embodiments, Pf1=0.25 (mm), Pf2=0.20 (mm), N=12, and R=5 (mm). In this case, L0 is calculated to be L0=9.42 (mm). Specifically, the length L0 required to make the bending radius of the optical fiber 2 larger than the allowable bending radius R when the holder 50 holds the optical fiber 2 is 9.42 mm.

Assume that L1 is the length, in the longitudinal direction, of the non-connecting region 30 extending out from the base end side (left side in FIG. 5A) of the sandwich portion when the sandwich portion sandwiches the non-connecting region 30 of the optical fiber ribbon 1 as illustrated in FIG. 5A. In this case, in order to set the length L1 to such a length that the bending radius of the optical fiber 2 is larger than the allowable bending radius R when the holder 50 holds the optical fiber 2, the length L1 is desirably set to the length L0 or more. Accordingly, in one or more embodiments, L1 is desirably 9.42 mm or more.

Modified Example

Figure 9A:
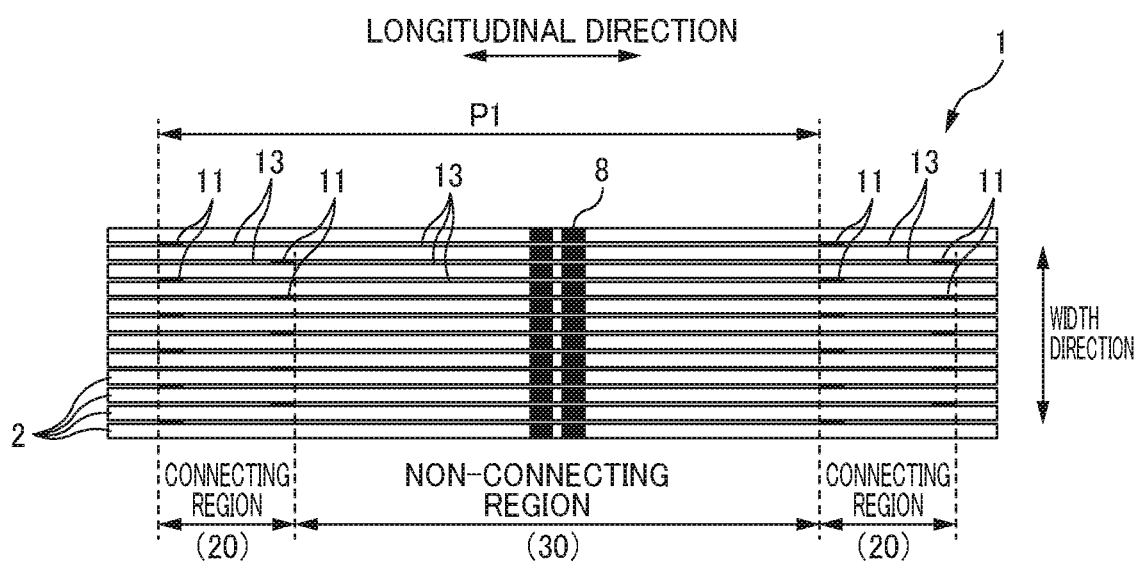
FIG. 9A is a diagram illustrating a modified example of the optical fiber ribbon 1 in one or more embodiments.

FIG. 9A is a diagram illustrating a modified example of the optical fiber ribbon 1 in one or more embodiments. The optical fiber ribbon 1 in the modified example illustrated in FIG. 9A is different from the optical fiber ribbon 1 illustrated in FIG. 1 in that it includes a mark 8.

The mark 8 is a mark formed in the non-connecting region 30. In other words, the mark 8 is a mark indicating the position of the non-connecting region 30. Moreover, the mark 8 is a mark for aligning the optical fiber ribbon 1 and the holder 50. The mark 8 is formed at the same position in the longitudinal direction in the respective optical fibers 2 and is thereby formed in a band shape across the optical fiber ribbon 1 in the width direction. The mark 8 may also have an identification function of the optical fiber ribbon 1. For example, the mark 8 of the optical fiber ribbon 1 in the FIG. 9A is formed in a pattern indicating that the optical fiber ribbon 1 is the second ribbon, and has the identification function of the optical fiber ribbon 1.

Note that the mark 8 of one or more embodiments is formed in all of the optical fibers 2 forming the optical fiber ribbon 1 to be formed across the entire optical fiber ribbon 1 in the width direction. However, the mark 8 only needs to be formed in some of the multiple optical fibers 2 forming the optical fiber ribbon 1. Moreover, when the mark 8 is formed only in some of the optical fibers 2, the mark 8 is desirably formed in at least the optical fiber 2 (first fiber or N-th fiber) at an end portion in the width direction to facilitate the alignment with the holder 50.

Figure 9B:
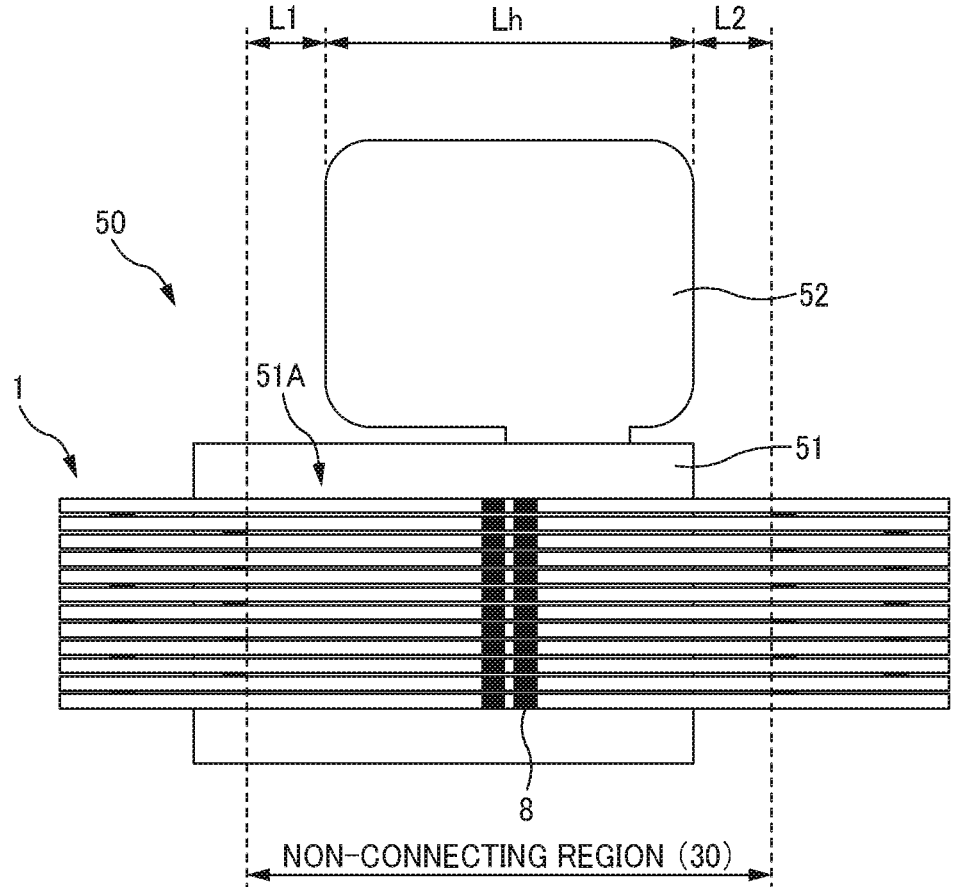
FIG. 9B is a diagram illustrating a method of using a mark 8.

FIG. 9B is a diagram illustrating a method of using the mark 8.

In S002 of the aforementioned method of fusion splicing the optical fibers 2 (or the method of arranging the optical fibers 2 (see FIG. 4), as illustrated in FIG. 9B, the worker aligns the optical fiber ribbon 1 and the holder 50 based on the mark 8 such that the mark 8 of the optical fiber ribbon 1 is located at the center of the placing surface 51A of the holder 50, and places the optical fiber ribbon 1 on the holder 50. The non-connecting region 30 of the optical fiber ribbon

1 can be thereby placed on the placing surface 51A of the holder 50. Since the mark 8 is highly noticeable even in a situation where it is difficult for the worker to see the positions of the connecting portions 11 and the position of the connecting region 20 or the non-connecting region 30, the work of placing the non-connecting region 30 of the optical fiber ribbon 1 on the placing surface 51A of the holder 50 (S002 of FIG. 4) is facilitated in the modified example.

Note that an alignment mark (not illustrated) to be aligned with the mark 8 of the optical fiber ribbon 1 may be formed in the placing surface 51A of the holder 50. This facilitates the work of aligning the optical fiber ribbon 1 and the holder 50 based on the mark 8.

Moreover, in one or more embodiments, as illustrated in FIG. 9B, when the optical fiber ribbon 1 and the holder 50 are aligned based on the mark 8 and the holder 50 is made to hold the optical fiber ribbon 1, a predetermined length (aforementioned length L1) of the non-connecting region 30 of extends out from the base end side of the sandwich portion and a predetermined length (aforementioned length L2) of the non-connecting region 30 extends out from the process side of the holder 50. Forming the mark 8 in the optical fiber ribbon 1 makes it easier to place the optical fiber ribbon 1 on the holder 50 such that the non-connecting region 30 of the optical fiber ribbon 1 extends out from both sides of the sandwich portion by the predetermined lengths as described above.

According to the aforementioned optical fiber arrangement method (or fusion splicing method) of one or more embodiments, the intermittently connected optical fiber ribbon including the multiple optical fibers 2 arranged side by side at the first fiber pitch Pf1 larger than the fiber diameter D is prepared (S001 of FIG. 4), and the width of the optical fiber ribbon 1 in the interior of the holder 50 is reduced by making the holder 50 hold the non-connecting region 30 of the optical fiber ribbon 1 (S003 of FIG. 4, see FIG. 5B). Then, in one or more embodiments, the connecting portions 11 of the optical fiber ribbon 1 extending out from the holder 50 are removed and the multiple optical fibers 2 (bare optical fibers 4) separated into single fibers can be thereby arranged at the second fiber pitch Pf2 (S004 of FIG. 4, see FIG. 6B). In one or more embodiments, when the worker makes the holder 50 hold the optical fiber ribbon 1, the optical fiber ribbon 1 is in a state where the optical fibers 2 are not detached and separated into single fibers and the connecting portions 11 are left to connect the multiple optical fibers 2 to one another in the end portion (process side end portion) of the optical fiber ribbon 1 (see FIGS. 3 and 5A). Accordingly, in one or more embodiments, handling of the multiple optical fibers 2 is easier than work of making the holder hold the multiple optical fibers detached and separated into single fibers, and workability of making the holder 50 hold the multiple optical fibers 2 is improved. As a result, the work of arranging the optical fibers 2 is facilitated in one or more embodiments. Moreover, in one or more embodiments, since the work of arranging the optical fibers 2 is facilitated, the fusion work is also facilitated.

Moreover, the aforementioned optical fiber ribbon 1 is the intermittently connected optical fiber ribbon that includes the multiple connecting portions 11 and the multiple optical fibers arranged side by side at the first fiber pitch Pf1 larger than the fiber diameter D and in which the multiple connecting portions 11 are intermittently arranged. The intermittently connected optical fiber ribbon 1 of one or more embodiments includes the connecting regions 20 in which the multiple connecting portions are 11 intermittently arranged to intermittently connect the multiple optical fibers (N optical fibers) and the non-connecting regions 30 that are each located between the connecting regions 20 and in which no connecting portions 11 are formed. According to the intermittently connected optical fiber ribbon 1 as described above, the multiple optical fibers 2 can be arranged at the second fiber pitch Pf2 (S004 of FIG. 4, see FIG. 6B) by making the holder 50 for the second fiber pitch Pf2 to hold the non-connecting region 30 (S003 of FIG. 4, see FIG. 5B) and removing the connecting portions 11 of the optical fiber ribbon 1 extending out from the holder 50. Thus, according to the intermittently connected optical fiber ribbon 1 of one or more embodiments, the work of arranging the multiple optical fibers 2, arranged side by side at the first fiber pitch Pf1, at the second fiber pitch Pf2 (work of arranging the optical fibers) is facilitated.

In one or more embodiments, i is 2, where i is the number of connecting sections 21 in one connecting region 20. However, i is not limited to 2 and may be another number. Moreover, j is 5 to 6 in one or more embodiments, where j is the number of connecting portions 11 in one connecting section 21. However, j is not limited to 5 and 6 and may be other numbers.

Figure 10A:
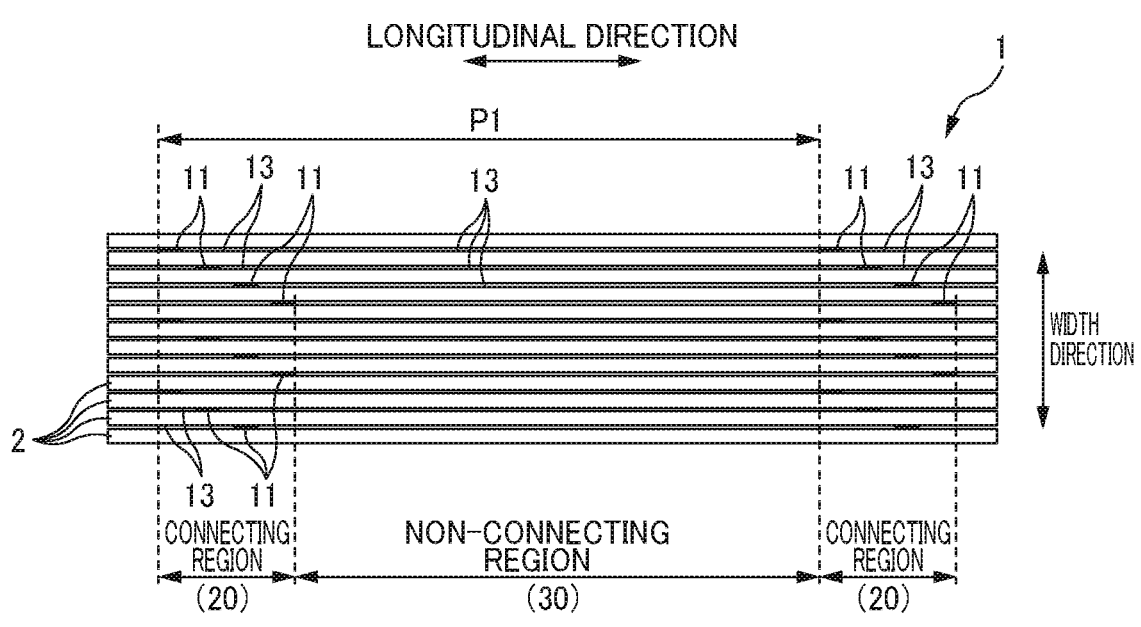
FIGS. 10A and 10B are diagrams illustrating the optical fiber ribbon 1 in one or more embodiments.
Figure 10B:
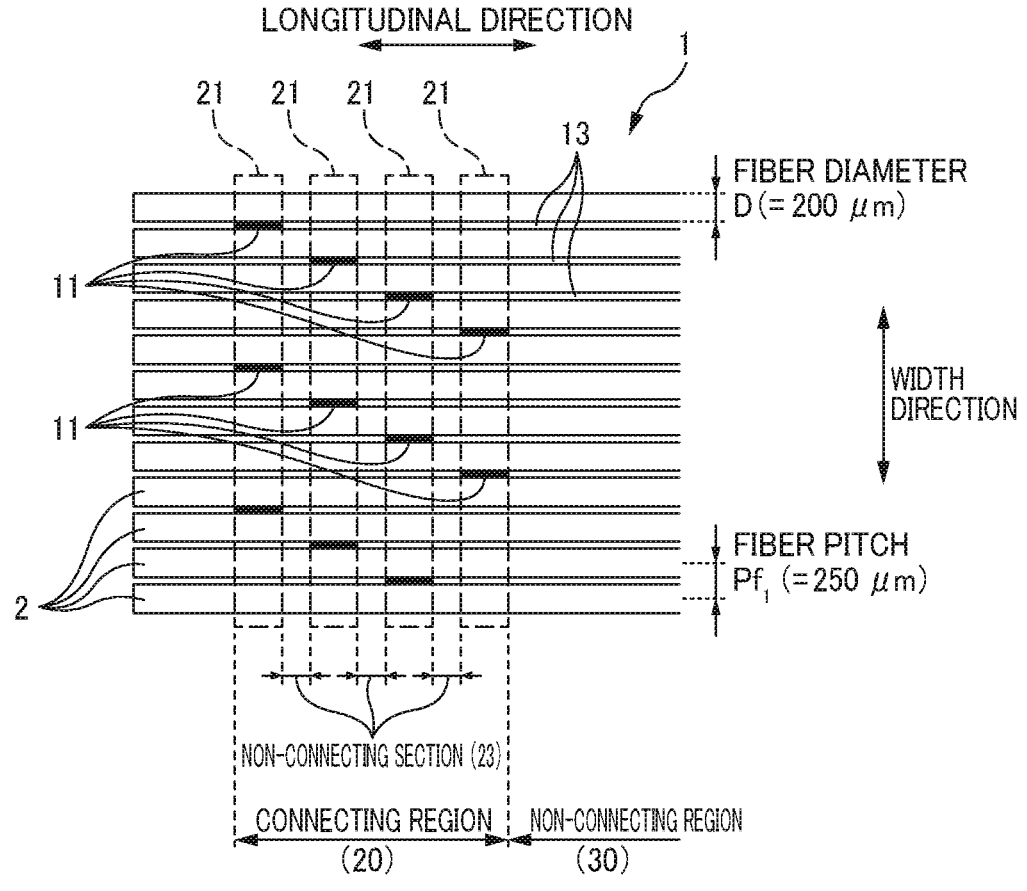

FIGS. 10A and 10B are diagrams illustrating the optical fiber ribbon 1 in one or more embodiments. FIG. 10B illustrates arrangement of the multiple connecting portions 11 formed in the connecting region 20 of the optical fiber ribbon 1 one or more embodiments.

As illustrated in FIG. 10A, the optical fiber ribbon 1 of one or more embodiments is also the intermittently connected optical fiber ribbon 1. The optical fiber ribbon 1 of one or more embodiments is also located with the connecting regions 20 and the non-connecting regions 30. As illustrated in FIG. 10B, each of the connecting regions 20 of one or more embodiments is also located with multiple connecting sections 21. In one or more embodiments, the number i of connecting sections 21 in one connecting region 20 is larger than that in the above-described embodiments and four connecting sections 21 are located in one connecting region 20. Meanwhile, in one or more embodiments, the number of connecting portions 11 in one connecting section 21 is smaller than that in the above-described embodiments and the number j of connecting portions 11 in one connecting section 21 is 2 to 3. In each of the connecting sections 21, three non-connecting portions 13 are arranged between the connecting portion 11 and the connecting portion 11. The positions of the connecting portions 11 vary among the connecting sections 21. Specifically, the multiple connecting portions 11 in the connecting sections 21 are arranged staggered in the width direction. The two adjacent optical fibers 2 are thereby connected to each other by at least one connecting portion 11 in each connecting region 20 and all optical fibers 2 are intermittently connected to one another by the multiple connecting portions 11 belonging to one connecting region 20.

In one or more embodiments, the number (2 in this example) of connecting portions 11 arranged in the connecting section 21 adjacent to the non-connecting region 30 (connecting section 21 farthest to the right in FIG. 10B) is smaller than the number (3 in this example) of connecting portions 11 arranged in each of the connecting sections 21 not adjacent to the non-connecting region 30 (for example, the second connecting section 21 from the right in FIG. 10B). This can reduce the effect of the connecting portions 11 outside the sandwich portion when the holder 50 is made to sandwich the non-connecting region 30 of the optical fiber ribbon 1 in one or more embodiments as illustrated in FIG.

5A. Accordingly, reduction of the intervals of the optical fibers 2 is facilitated and reduction of the width of the optical fiber ribbon 1 in the interior of the holder 50 (specifically, interior of the sandwich portion of the holder 50) is facilitated.

Moreover, in one or more embodiments, the non-connecting portions 13 are arranged (three non-connecting portions 13 are arranged in this example) on the outer side of (above or below in FIG. 10B) each of the connecting portions 11 arranged in the connecting section 21 adjacent to the non-connecting region 30 (connecting section 21 farthest to the right in FIG. 10B). This facilitates inward displacement of the optical fibers 2 located in end portions of the optical fiber ribbon 1 (optical fibers 2 located on the outer sides in the width direction; first fiber and N-th fiber) when the holder 50 sandwiches the non-connecting region 30 of the optical fiber ribbon 1 in one or more embodiments as illustrated in FIG. 5A. Accordingly, reduction of the intervals of the optical fibers 2 is facilitated and reduction of the width of the optical fiber ribbon 1 is facilitated in the interior of the holder 50 (sandwich portion).

In the aforementioned embodiments, the sandwich portion of the holder 50 sandwiches the non-connecting region 30 of the optical fiber ribbon 1 (the holder 50 is made to hold the optical fiber ribbon 1 while the sandwich portion is made not to sandwich the region where the connecting portions 11 are formed). However, the sandwich portion of the holder 50 may sandwich a portion of the connecting region 20 of the optical fiber ribbon 1.

Figure 11A:
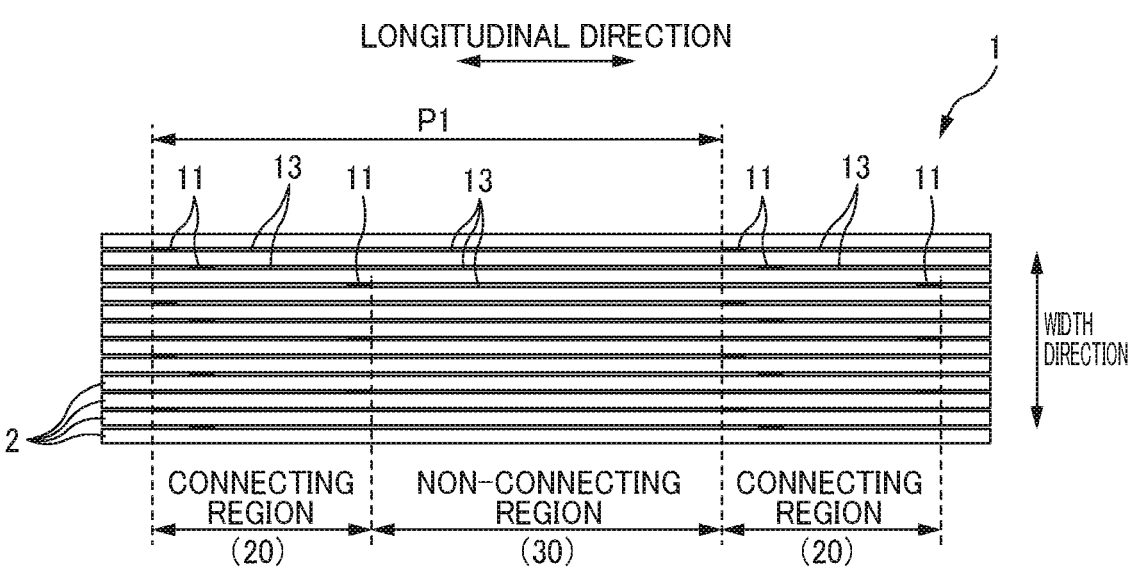
FIGS. 11A and 11B are diagrams illustrating the optical fiber ribbon 1 in one or more embodiments.
Figure 11B:
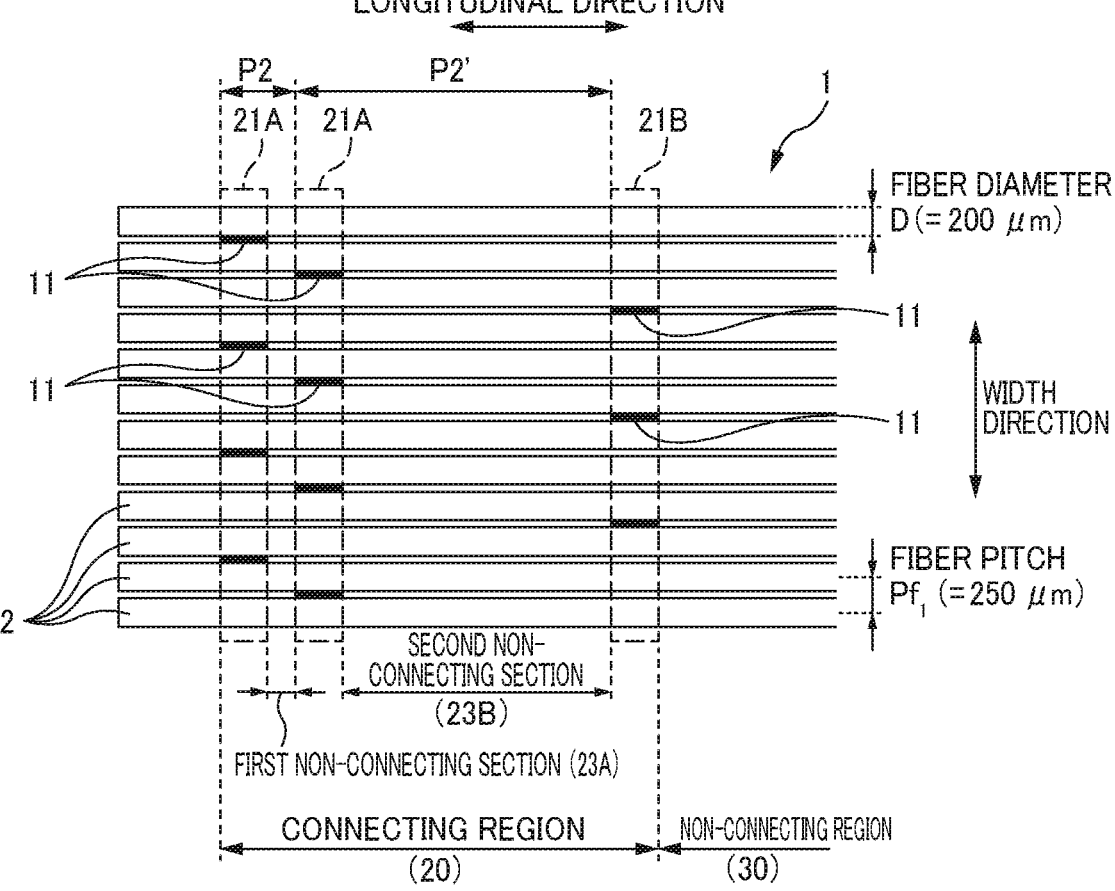

FIGS. 11A and 11B are diagrams illustrating the optical fiber ribbon 1 in one or more embodiments. FIG. 11B illustrates arrangement of multiple connecting portions 11 formed in the connecting region 20 of the optical fiber ribbon 1 in one or more embodiments.

In one or more embodiments, three connecting sections 21 are located in one connecting region 20 (specifically, i is 3). In the following description, the left two connecting sections 21 among the three connecting sections 21 in FIG. 11B are referred to as first connecting sections 21A and the connecting section 21 on the right side of FIG. 11B is referred to as second connecting section 21B in some cases. The second connecting section 21B is the connecting section 21 arranged adjacent to the non-connecting region 30. Moreover, the second connecting section 21B is the connecting section 21 arranged on the sandwich portion side of the first connecting sections 21A when the holder 50 is made to sandwich the optical fiber ribbon 1.

Also, in one or more embodiments, the non-connecting section 23 in which no connecting portions 11 are present in the width direction is located between each adjacent pair of the connecting section 21 and the connecting section 21. In the following description, the non-connecting section 23 between the two first connecting sections 21A is sometimes referred to as a first non-connecting section 23A. Moreover, the non-connecting section 23 between the first connecting section 21A and the second connecting section 21B is sometimes referred to as the second non-connecting section 23B.

In one or more embodiments, the length of the second non-connecting section 23B in the longitudinal direction is larger than the length of the first non-connecting section 23A in the longitudinal direction. In other words, an interval between the first connecting section 21A and the second connecting section 21B in the longitudinal direction (section pitch P2' in FIG. 11B) is larger than an interval between the first connecting section 21A and the first connecting section 21A in the longitudinal direction (section pitch P2 in FIG.

11B). Accordingly, the second connecting section 21B arranged adjacent to the non-connecting region 30 (connecting section 21 farthest to the right in FIG. 11B) is arranged to be shifted away from the first connecting sections 21A, toward the non-connecting region 30.

Figure 12:
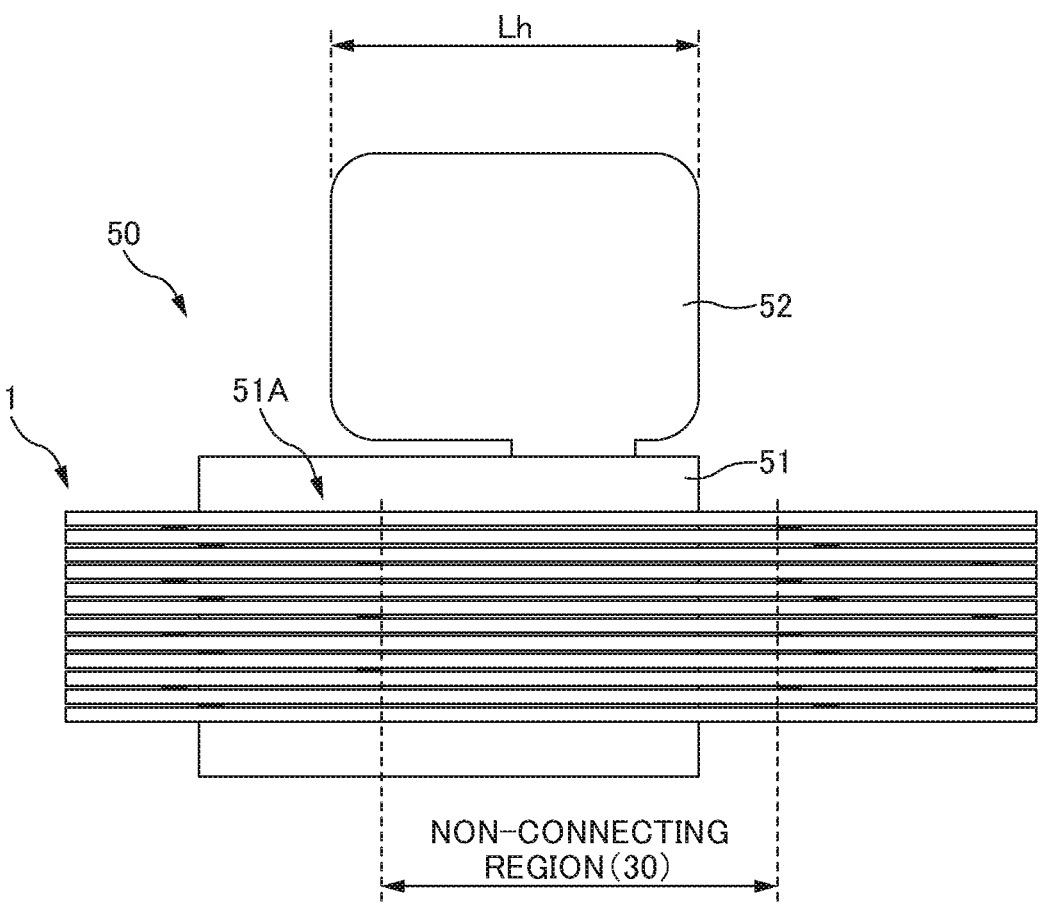
FIG. 12 is a diagram illustrating how the optical fiber ribbon 1 of one or more embodiments is placed on the holder 50.
Figure 13A:
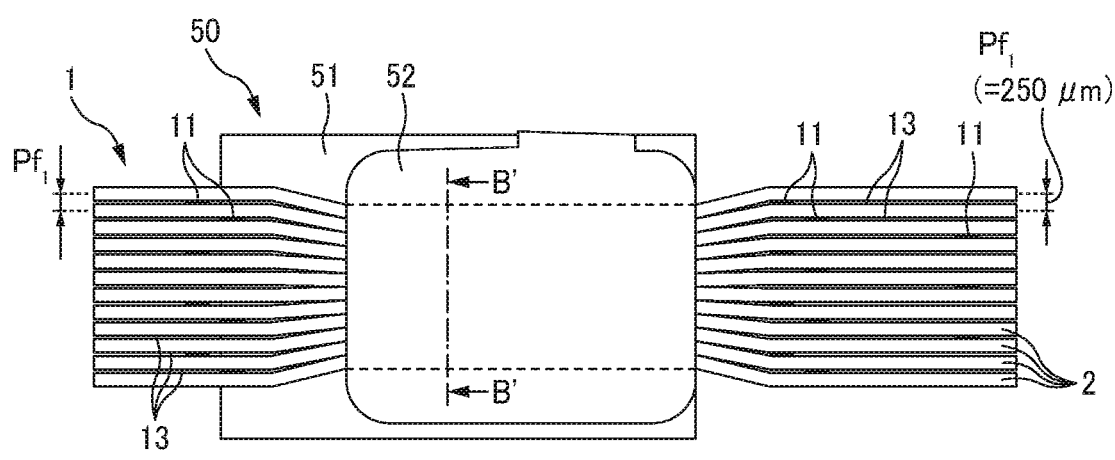
FIG. 13A is a diagram illustrating how the holder 50 holds the optical fiber ribbon 1 in one or more embodiments.
Figure 13B:
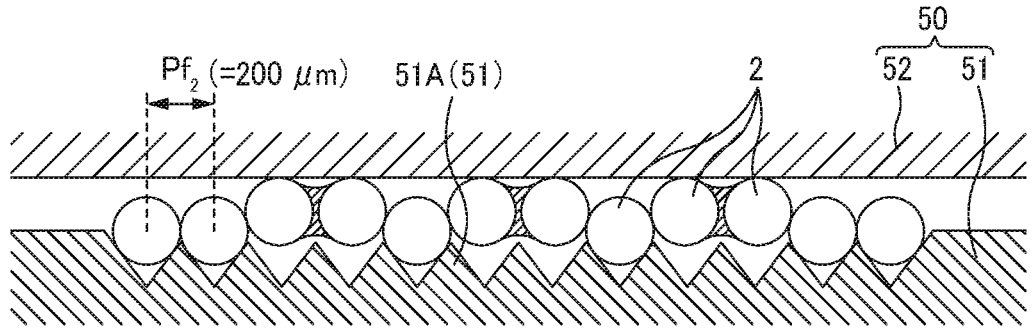
FIG. 13B is an enlarged diagram of a B'-B' cross section in FIG. 13A.

FIG. 12 is a diagram illustrating how the optical fiber ribbon 1 in one or more embodiments is placed on the holder 50. FIG. 13A is a diagram illustrating how the holder 50 holds the optical fiber ribbon 1 in one or more embodiments. FIG. 13B is an enlarged diagram of a B'-B' cross section in FIG. 13A.

In one or more embodiments, since the second connecting section 21B arranged adjacent to the non-connecting region 30 is arranged to be shifted away from the first connecting sections 21A, toward the non-connecting region 30, the second connecting section 21B is sometimes included in a region to be sandwiched by the sandwich portion (placing surface 51A of the base 51 and the lid 52 in this example) of the holder 50. In other words, in one or more embodiments, the connecting portions 11 are sometimes included in the region to be sandwiched by the sandwich portion (placing surface 51A of the base 51 and the lid 52 in this example) of the holder 50.

Also, in one or more embodiments, since the non-connecting region 30 of the optical fiber ribbon 1 is placed on the placing surface 51A of the holder 50 to face the lid 52 (see FIG. 12), the non-connecting region 30 of the optical fiber ribbon 1 is sandwiched by the placing surface 51A of the base 51 and the lid 52 when the lid 52 of the holder 50 is closed. Since the optical fibers 2 are not bound to each other in the non-connecting region 30, the intervals of the multiple optical fibers 2 in the non-connecting region 30 decrease according to the pitch (second fiber pitch Pf2) of the V-grooves on the placing surface 51A when the holder 50 sandwiches the non-connecting region 30 also in one or more embodiments.

Note that, in one or more embodiments, since the sandwich portion of the holder 50 sandwiches the connecting portions 11 in the second connecting section 21B and the interval between the two optical fibers 2 connected to each other by each connecting portion 11 is fixed by the connecting portion 11, the interval is substantially the first fiber pitch Pf1 (=250 µm). However, since the optical fibers 2 are not bounded to one another in the non-connecting portions 13 included in the second connecting section 21B, the intervals between some of the optical fibers 2 in the second connecting section 21B become smaller than the first fiber pitch Pf1 according to the pitch of the V-grooves on the placing surface 51A (see FIG. 13B). Particularly, in one or more embodiments, since the second connecting section 21B sandwiched by the holder 50 is arranged to be shifted toward the non-connecting region 30, the intervals between the optical fibers 2 not bounded to one another by the connecting portions 11 in the second connecting section 21B easily become smaller than the first fiber pitch Pf1. As a result, the dimension of the optical fiber ribbon 1 in the width direction in the second connecting section 21B (dimension of the optical fiber ribbon 1 in the width direction in FIG. 13B) becomes smaller than that before the holding by the holder 50.

Figure 13C:
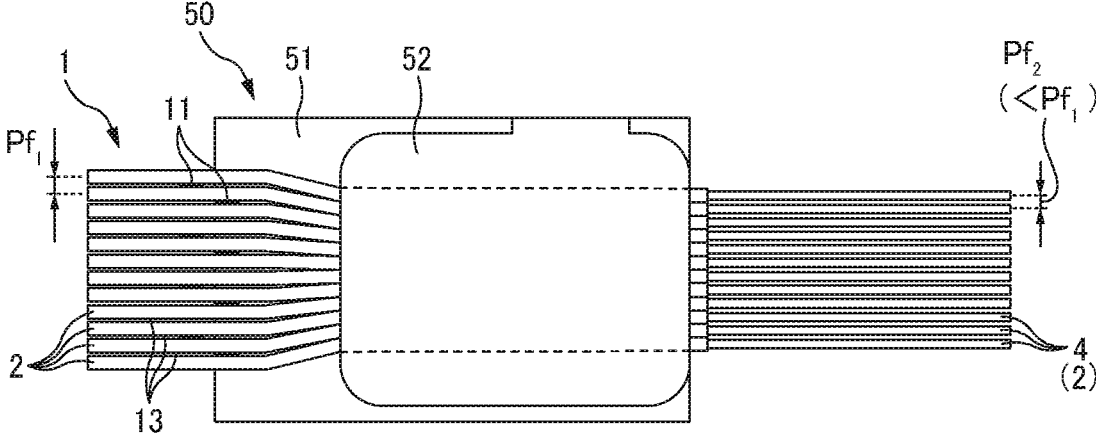
FIG. 13C is a diagram illustrating the optical fiber ribbon 1 held by the holder 50 and subjected to the coating removal.

FIG. 13C is a diagram illustrating the optical fiber ribbon 1 held by the holder 50 and subjected to the coating removal.

Also in one or more embodiments, when the connecting portions 11 are removed on the process side (right side in the drawing) of the holder 50, the bounding of the optical fibers 2 by the connecting portions 11 is released and the intervals of the multiple optical fibers 2 (bare optical fibers 4) become the second fiber pitch Pf2 (=200 µm) according to the pitch of the V-grooves on the placing surface 51A. Specifically, on the process side (right side in the drawing) of the holder 50, removal of the coating of the optical fibers 2 causes the optical fibers 2 (bare optical fibers 4) to be arranged at the second fiber pitch Pf2.

Regarding Number of Connecting Portions 11

Figure 14:
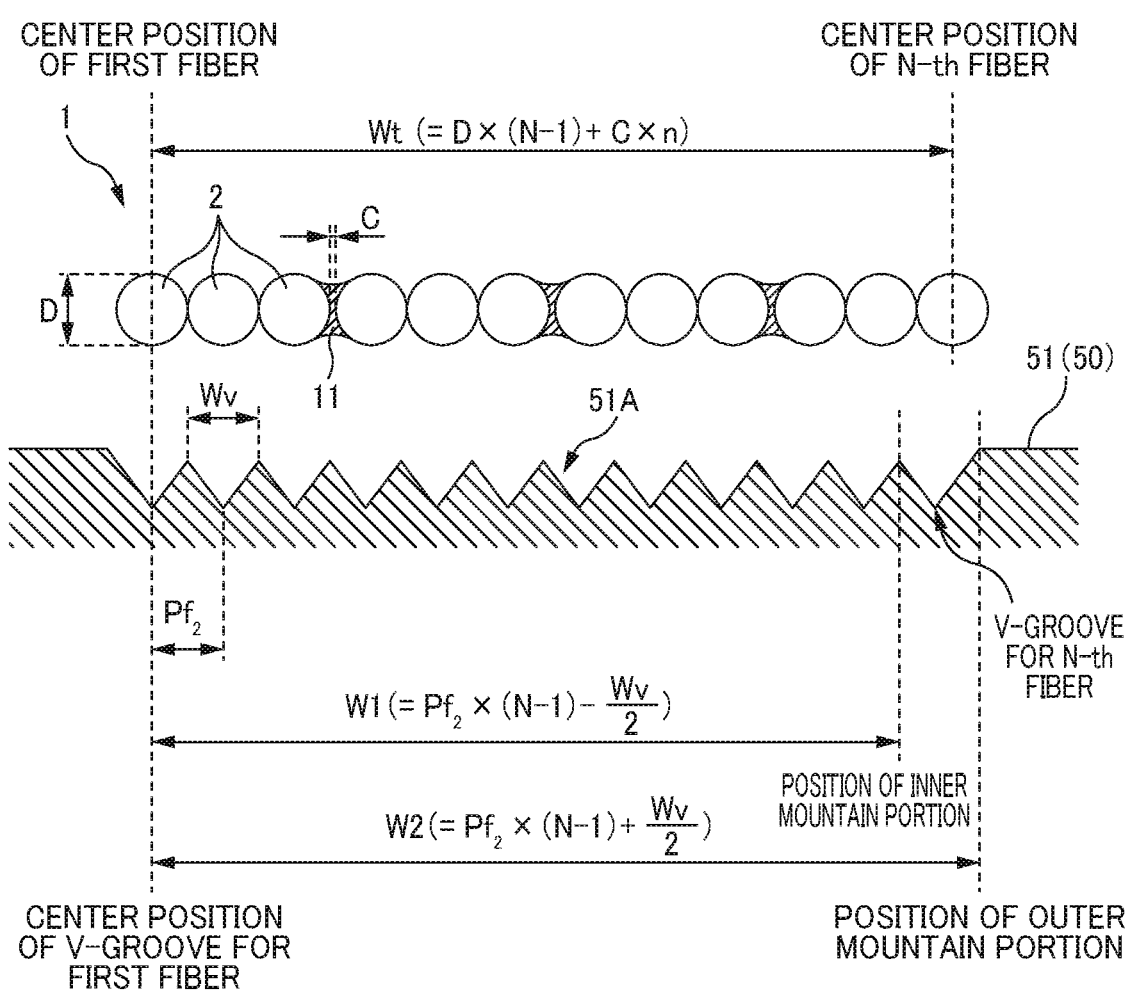
FIG. 14 is a diagram illustrating the number of connecting portions 11 allowable in a second connecting section 21B.

FIG. 14 is a diagram illustrating the number of connecting portions 11 allowable in the second connecting section 21B.

The multiple optical fibers 2 in the second connecting sections 21B are illustrated in an upper portion of FIG. 14. In one or more embodiments, the worker makes the holder 50 hold the optical fiber ribbon 1 while narrowing the second connecting section 21B of the optical fiber ribbon 1 in the width direction with fingers. Accordingly, the optical fiber ribbon 1 in FIG. 14 is narrowed in the width direction. In each non-connecting portion 13, the two adjacent optical fibers 2 are in contact with each other. In each connecting portion 11, because the connecting portion 11 bounds the two adjacent optical fibers 2 to each other, the optical fibers 2 are located away from each other by an amount (width C) corresponding to the connecting portion 11.

The V-grooves formed on the placing surface 51A of the holder 50 are illustrated in a lower portion of FIG. 14. In one or more embodiments, the worker aligns the optical fiber 2 (first fiber in this example) in one end portion of the optical fiber ribbon 1 with the V-groove and then aligns the other optical fibers 2 with the respective V-grooves while reducing the intervals of the multiple optical fibers 2 in the second connecting section 21B. Accordingly, the center position of the V-groove (V-groove for the first fiber) at the left end of FIG. 14 is illustrated to be aligned with the position of the optical fiber 2 (first fiber) at the left end of FIG. 14.

Assume a case where the number n of the connecting portions 11 is too large. In this case, there is a risk that, even if the intervals of the multiple optical fibers 2 in the second connecting section 21B are reduced, the center position of the optical fiber 2 in the other end portion (N-th fiber at the right end of FIG. 14) is located outside the V-groove and the optical fibers 2 cannot be arranged in the V-grooves. Accordingly, the center position of the optical fiber 2 (N-th fiber in this example) in the other end portion of the optical fiber ribbon 1 is desirably located on the V-groove for the N-th fiber when the intervals of the multiple optical fibers 2 in the second connecting section 21B are reduced.

In this description, Wt is a distance between the centers of the optical fibers 2 (first fiber and N-th fiber) at both ends in the case where the intervals of the multiple optical fibers 2 in the second connecting section 21B are reduced. Moreover, W1 is a width from the center position of the V-groove (V-groove for the first fiber in this example) in the one end portion to an inner mountain portion forming the V-groove (V-groove for the N-th fiber in this example) in the other end portion. Furthermore, W2 is a width from the center position of the V-groove (V-groove for the first fiber in this example) in the one end portion to an outer mountain portion forming the V-groove (V-groove for the N-th fiber in this example) in the other end portion. In this case, Wt, W1, and W2 desirably satisfy the following relationship.

$$W1 < Wt < W2$$

In other words, the number n of connecting portions 11 in the second connecting section 21B is desirably set to such a number that the aforementioned relationship ($W1 < Wt < W2$) can be established.

Assume that D is the fiber diameter of the optical fibers 2, N is the number of optical fibers 2, C is the width of the connecting portions 11, and n is the number of connecting portions 11. In this case, as illustrated in the upper portion of FIG. 14, the distance Wt between the centers of the optical fibers 2 (first fiber and N-th fiber) at both ends of the optical fiber ribbon 1 is as in the following formula.

$$Wt=D\times(N-1)+C\times n$$

Moreover, as illustrated in the lower portion of the drawing, the pitch of the V-grooves corresponds to the aforementioned second fiber pitch Pf2. Furthermore, the number of V-grooves is N and is the same as the number of optical fibers 2 forming the optical fiber ribbon 1. Assuming that Wv is the width of one V-groove, W1 that is the width from the center position of the V-groove for the first fiber (or the N-th fiber) to the inner mountain portion forming the V-groove for the N-th fiber and W2 that is the width from the center position of the V-groove for the first fiber (or the N-th fiber) to the outer mountain portion forming the V-groove for the N-th fiber are as in the following formulae.

$$W1=Pf2\times(N-1)-(Wv/2)$$

$$W2=Pf2\times(N-1)+(Wv/2)$$

Figure 15A:
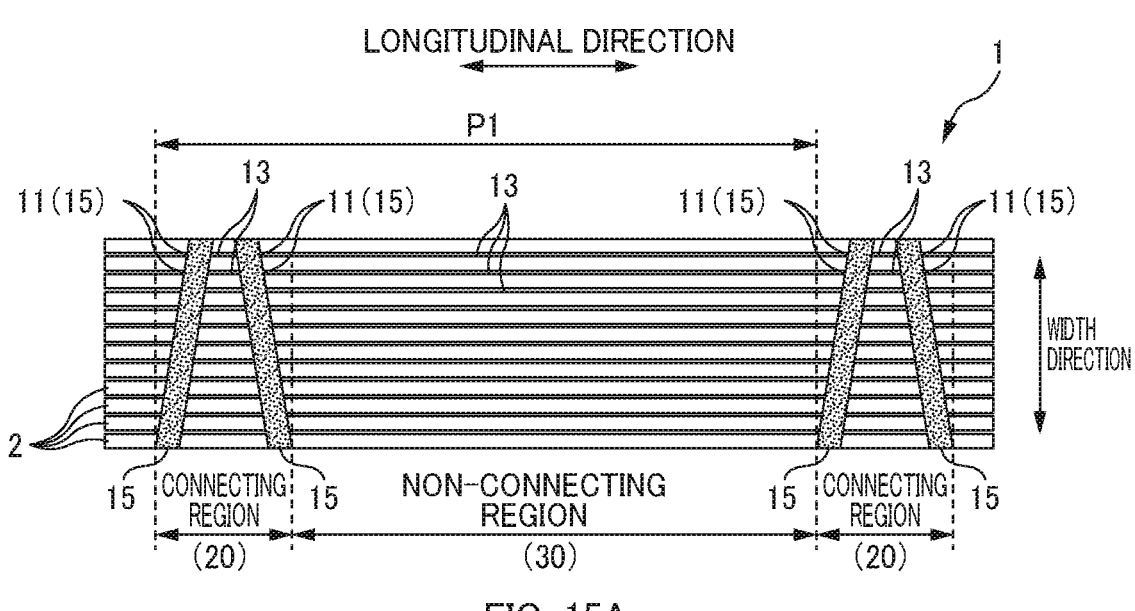
FIGS. 15A and 15B are diagrams illustrating the optical fiber ribbon 1 in one or more embodiments.
Figure 15B:
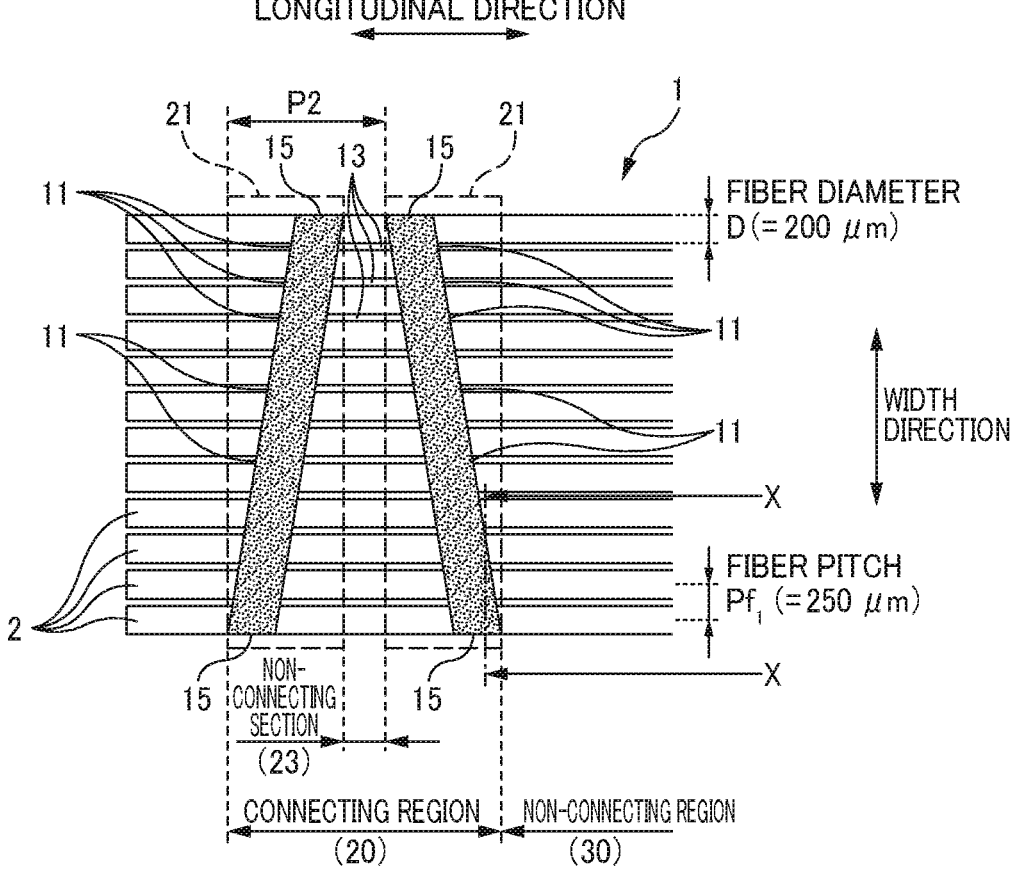
Figure 16:
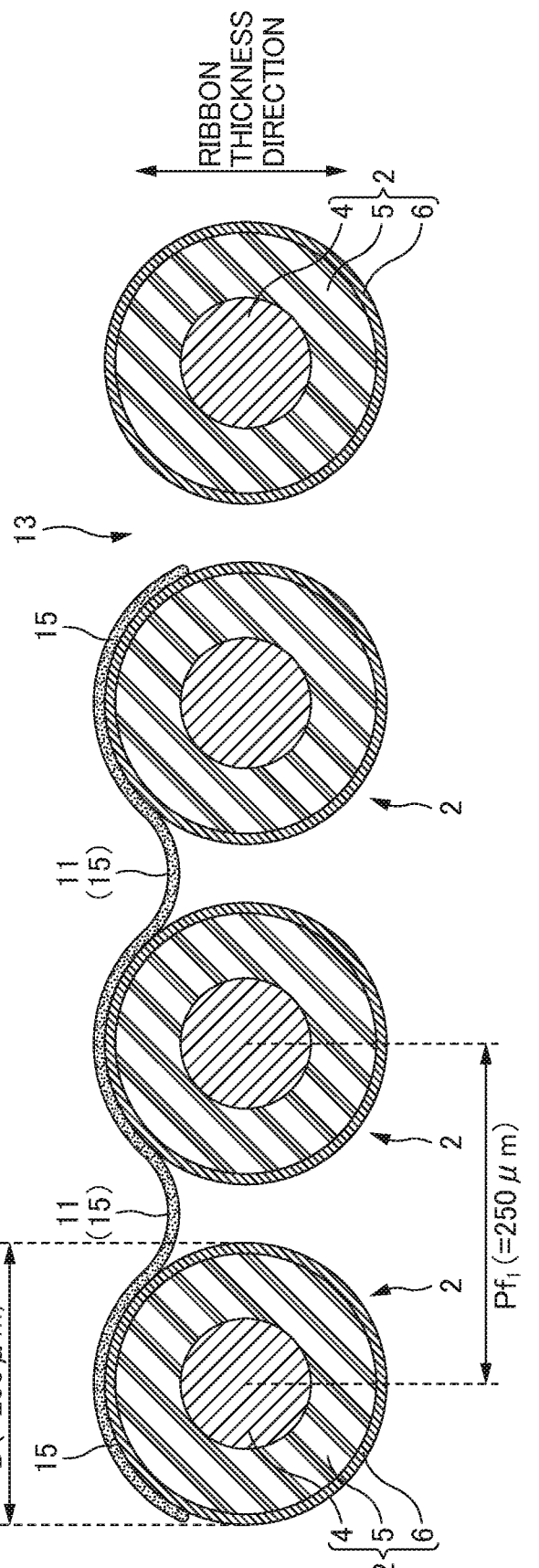
FIG. 16 is an enlarged diagram of an X-X cross section in FIG. 15B.

FIGS. 15A and 15B are diagrams illustrating the optical fiber ribbon 1 in one or more embodiments. FIG. 16 is an enlarged diagram of an X-X cross section in FIG. 15B.

Also, in one or more embodiments, the optical fiber ribbon 1 is an optical fiber ribbon in which multiple optical fibers 2 are arranged side by side and intermittently connected to one another. In one or more embodiments, a ribbon forming material is applied onto a ribbon surface (surface parallel to the longitudinal direction and the width direction) of the optical fiber ribbon 1 in a band shape and is cured to form the ribbon forming material layer 15 in the band shape. Applying and curing the ribbon forming material between two optical fibers 2 forms the connecting portion 11 between the two optical fibers 2. Also, in one or more embodiments, multiple connecting portions 11 are intermittently arranged in the longitudinal direction between the two adjacent optical fibers 2. Moreover, the non-connecting portion 13 (separated portion) is formed between each pair of the connecting portion 11 and the connecting portion 11 intermittently formed in the longitudinal direction. In one or more embodiments, the band-shaped ribbon forming material layer 15 is arranged to be tilted with respect to the width direction. The non-connecting portions 13 are thereby arranged in the width direction of the connecting portions 11 formed of the ribbon forming material layer 15.

Moreover, also in one or more embodiments, the multiple optical fibers 2 are arranged side by side at intervals larger than the outer diameter of the optical fibers 2. In this example, the outer diameter (fiber diameter D) of the optical fibers 2 is 200 μm and the intervals (first fiber pitch Pf1) of the optical fibers 2 in the width direction are 250 μm. Accordingly, also in one or more embodiments, two adjacent optical fibers 2 are formed not in contact with each other.

Also, in one or more embodiments, the intermittently connected optical fiber ribbon 1 is located with the connecting regions 20 and the non-connecting regions 30, and the connecting regions 20 and the non-connecting regions 30 are alternately formed in the longitudinal direction. Also, in one or more embodiments, in each connecting region 20, the multiple connecting portions 11 connect all optical fibers 2 (12 optical fibers 2 in this example) to one another. Moreover, also in one or more embodiments, no connecting portions 11 are formed in the non-connecting regions 30. The connecting regions 20 are repeatedly arranged at the predetermined pitch P1 in the longitudinal direction.

As illustrated in FIG. 15B, each connecting region 20 includes multiple connecting sections 21. In this example, one connecting region 20 includes two connecting sections 21. Note that i is not limited to 2 and may be 1 or 3 or more, where i is the number of connecting sections 21 in one connecting region 20.

Also, in one or more embodiments described above, the multiple optical fibers 2 can be arranged at the second fiber pitch Pf2 (S004 of FIG. 4, see FIG. 6B) by making the holder 50 for the second fiber pitch Pf2 hold the non-connecting region 30 (S003 in FIG. 4, see FIG. 5B) and removing the coating of the multiple optical fibers 2 extending out from the holder 50. Accordingly, also in the intermittently connected optical fiber ribbon 1 of one or more embodiments, the work of arranging the multiple optical fibers 2, arranged side by side at the first fiber pitch Pf1, at the second fiber pitch Pf2 (work of arranging the optical fibers) is facilitated.

In the aforementioned embodiments, the method of arranging the optical fibers 2, arranged side by side at the pitch of 250 μm, at the pitch of 200 μm is used in the method of fusion splicing the optical fibers 2. However, the method of arranging the optical fibers 2 in this disclosure may be used in methods other than the method of fusion splicing the optical fibers 2.

Figure 17:
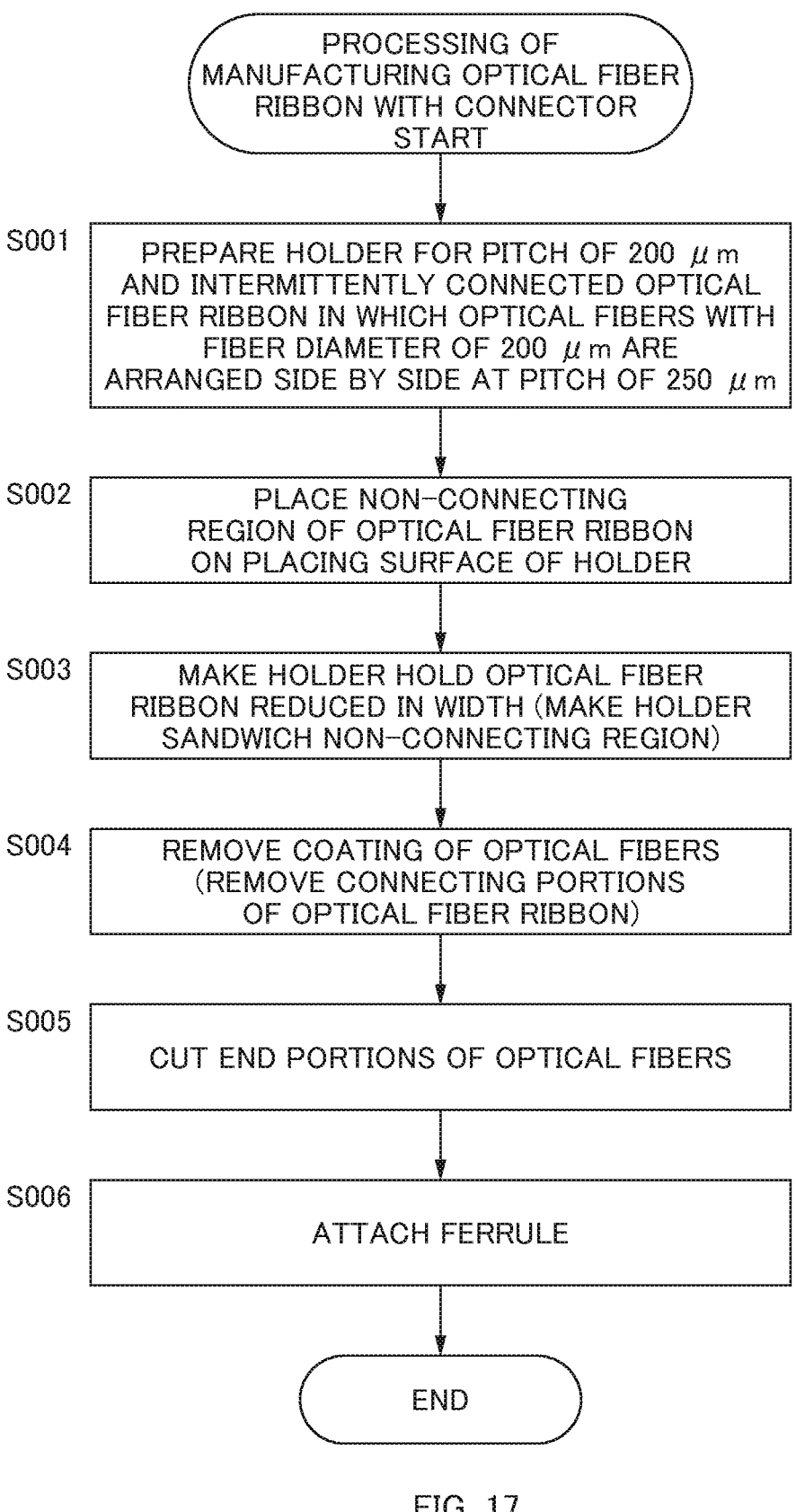
FIG. 17 is a flowchart of processing of manufacturing the optical fiber ribbon 1 with a connector.

FIG. 17 is a flowchart of processing of manufacturing the optical fiber ribbon 1 with a connector. Note that FIG. 17 also includes a processing flow (S001 to S004) of arranging the optical fibers 2 at the pitch of 200 μm, the optical fibers 2 forming the optical fiber ribbon 1 in which the optical fibers 2 with the fiber diameter of 200 μm are arranged side by side at the pitch of 250 μm and intermittently connected to one another. In the following description, intervals of multiple fiber holes formed in the connector (specifically, a ferrule 70 illustrated in FIG. 18) are sometimes referred to as "second fiber pitch Pf2". Note that the second fiber pitch Pf2 only needs to be smaller than the first fiber pitch Pf1 and is not limited to 200 μm.

S001 to S005 in FIG. 17 are the same processes as S001 to S005 in FIG. 4 described above. Description of S001 to S005 is omitted in this section.

Figure 18:
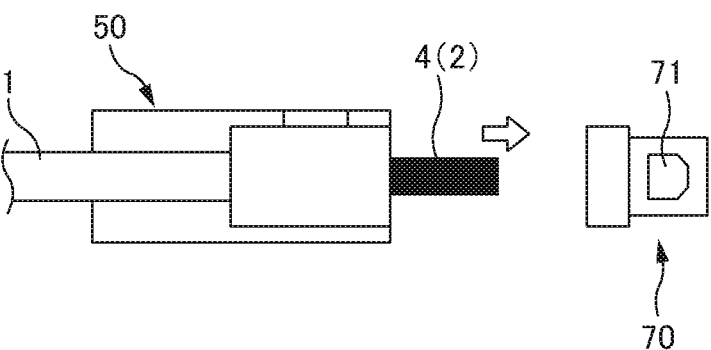
FIG. 18 is a diagram illustrating a process of S106 in one or more embodiments.

FIG. 18 is a diagram illustrating a process of S106 in one or more embodiments.

In S106, the worker attaches the ferrule 70 to end portions of the optical fibers 2. The ferrule 70 in FIG. 18 is an optical connector (MT ferrule) specified in JIS C 5981 (F12 type connectors for optical fiber ribbons). Note that the optical connector to be attached to the end portions of the optical fibers 2 is not limited to this ferrule 70 (MT ferrule) and may be another optical connector (for example, a lens ferrule in which lenses are formed on an end surface).

Multiple fiber holes (not illustrated) are formed in the ferrule 70 at the second fiber pitch Pf2. As illustrated in FIG. 18, the worker inserts the multiple optical fibers 2 (bare optical fibers 4) arranged at the second fiber pitch Pf2 and extending out from the process side of the holder 50 into the respective fiber holes of the ferrule 70 with the holder 50 holding the multiple optical fibers 2. After inserting the end portions of the optical fibers 2 into the fiber holes of the ferrule 70, the worker fills an adhesive filling window 71 of the ferrule 70 with adhesive to bond and fix the optical fibers 2 to the ferrule 70. The end portions of the optical fibers 2 are thereby attached to the ferrule 70.

Also, in one or more embodiments, the intermittently connected optical fiber ribbon including the multiple optical fibers 2 arranged side by side at the first fiber pitch Pf1 larger than the fiber diameter D is prepared (S001), and the width of the optical fiber ribbon 1 is reduced in the interior of the holder 50 by making the holder 50 hold the non-connecting region 30 of the optical fiber ribbon 1 (S003, see FIG. 5B). Accordingly, also in one or more embodiments, the multiple optical fibers 2 (bare optical fibers 4) separated into single fibers can be arranged at the second fiber pitch Pf2 by removing the connecting portions 11 of the optical fiber ribbon 1 extending out from the holder 50 (S004, see FIG. 6B). Moreover, also in one or more embodiments, when the worker makes the holder 50 hold the optical fiber ribbon 1, the optical fiber ribbon 1 is in a state where the optical fibers 2 are not detached and separated into single fibers and the connecting portions 11 are left to connect the multiple optical fibers 2 to one another in the end portion (process side end portion) of the optical fiber ribbon 1 (see FIGS. 3 and 5A). Accordingly, also in one or more embodiments, handling of the multiple optical fibers 2 is easier than work of making the holder hold the multiple optical fibers detached and separated into single fibers, and workability of making the holder 50 hold the multiple optical fibers 2 is improved. As a result, the work of arranging the optical fibers 2 is facilitated in one or more embodiments. Moreover, in one or more embodiments, since the work of arranging the optical fibers is facilitated, work of manufacturing an optical fiber ribbon with a connector is also facilitated.

Others

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 optical fiber ribbon
2 optical fiber
4 bare optical fiber
5 coating layer
6 colored layer
8 mark
11 connecting portion
13 non-connecting portion
15 ribbon forming material layer
20 connecting region
21 connecting section
21A first connecting section
21B second connecting section
23 non-connecting section
23A first non-connecting section
23B second non-connecting section
30 non-connecting region
40 fusion splicing device
41 electrode portion
42 holder set portion
50 holder
51 base
51A placing surface
52 lid

60 coating removal device
61 main body portion
61A blade
62 grip portion
70 ferrule
71 adhesive filling window

What is claimed is:

1. An optical fiber arrangement method comprising:
preparing an intermittently connected optical fiber ribbon including optical fibers arranged side by side at a first pitch larger than a fiber diameter, wherein
the optical fiber ribbon has connecting regions in which the optical fibers are connected and a non-connecting region between the connecting regions,
each of the connecting regions includes connecting sections intermittently arranged in a longitudinal direction of the optical fiber ribbon,
each of the connecting sections includes connecting portions intermittently arranged in a width direction of the optical fiber ribbon, and
holding the non-connecting region of the optical fiber ribbon with a holder, wherein the connecting portions of the optical fiber ribbon intermittently connect the optical fibers extending out from the holder to each other;
changing a width of the optical fiber ribbon in an interior of the holder; and
arranging the optical fibers extending out from the holder, wherein intervals of the optical fibers are changed from the first pitch to a second pitch smaller than the first pitch by removing the connecting portions in a holding state where the holder is holding the optical fibers.

2. The optical fiber arrangement method according to claim 1, wherein the removing of the connecting portions includes removing a coating of the optical fibers extending out from the holder in the holding state.

3. An optical fiber fusion splicing method comprising:
arranging, according to the optical fiber arrangement method of claim 2, the optical fibers, extending out from the holder, at the second pitch smaller than the first pitch;
in the holding state, cutting, to a predetermined length, end portions of the optical fibers that extend out from the holder and that have been removed of a coating;
setting the holder in a fusion splicing device; and
in the holding state, fusing the optical fibers arranged at the second pitch by using the fusion splicing device.

4. A method for manufacturing an optical fiber ribbon with a connector, comprising:
arranging, according to the optical fiber arrangement method of claim 2, the optical fibers, extending out from the holder, at the second pitch smaller than the first pitch;
in the holding state, cutting, to a predetermined length, end portions of the optical fibers that extend out from the holder and that have been removed of a coating; and
in the holding state, attaching the end portions of the optical fibers to a ferrule by inserting the optical fibers arranged at the second pitch into fiber holes of the ferrule.

5. The optical fiber arrangement method according to claim 1, wherein the holding of the non-connecting region includes aligning a position of the optical fiber ribbon in the holder based on a mark formed in the non-connecting region of the optical fiber ribbon.

6. The optical fiber arrangement method according to claim 1, wherein a number of the connecting portions arranged in a first connecting section adjacent to the non-connecting region is smaller than a number of the connecting portions arranged in a second connecting section not adjacent to the non-connecting region.

7. The optical fiber arrangement method according to claim 1, wherein in one of the connecting sections adjacent to the non-connecting region, one of the optical fibers located at an end in the width direction of the optical fiber ribbon is not connected to an adjacent one of the optical fibers by any of the connecting portions.

8. The optical fiber arrangement method according to claim 1, wherein a sandwich portion of the holder sandwiches the optical fiber ribbon in the non-connecting region.

9. The optical fiber arrangement method according to claim 8, wherein a bending radius of the optical fibers extending out from a base end side of the sandwich portion is equal to or larger than a predetermined bending radius when the sandwich portion sandwiches the non-connecting region.

10. The optical fiber arrangement method according to claim 8, wherein a length of the non-connecting region extending out from a base end side of the sandwich portion is 9.42 mm or more when the sandwich portion sandwiches the non-connecting region.

11. The optical fiber arrangement method according to claim 8, wherein a length of the non-connecting region is larger than a length obtained by adding 11.42 mm to a length by which the sandwich portion of the holder sandwiches the optical fiber ribbon.

12. The optical fiber arrangement method according to claim 1, wherein a connecting region including the connecting portions is partially included in a region of the optical fiber ribbon that is sandwiched by a sandwich portion of the holder.

13. The optical fiber arrangement method according to claim 12, wherein first connecting sections are sections of the optical fiber ribbon that include the connecting portions intermittently arranged in the width direction of the optical fiber ribbon, a second connecting section is a connecting section disposed adjacent to the non-connecting region, the connecting region includes an intermittent arrangement of the first connecting sections and the second connecting section in a longitudinal direction of the optical fiber ribbon, an interval between one of the first connecting sections that is adjacent to the second connecting section and the second connecting section in the longitudinal direction is larger than an interval between the first connecting sections in the longitudinal direction, and the second connecting section is included in the region of the optical fiber ribbon sandwiched by the sandwich portion of the holder.

14. The optical fiber arrangement method according to claim 13, wherein $$W1 < Wt < W2, \text{ where}$$

$$Wt = D \times (N-1) + C \times n$$

$$W1 = Pf2 \times (N-1) - (Wv/2)$$

$$W2 = Pf2 \times (N-1) + (Wv/2),$$

D is the fiber diameter,

N is a number of the optical fibers forming the optical fiber ribbon and a number of V-grooves in the holder, C is an amount of a gap between two of the optical fibers connected by each of the connecting portions, n is the number of the connecting portions in the second connecting section, Pf2 is the second pitch, and Wv is a width of one of the V-grooves.

15. The optical fiber arrangement method according to claim 1, wherein the changing of the width of the optical fiber ribbon in the interior of the holder reduces the width of the optical fiber ribbon.

\* \* \* \* \*